United States Patent
Bhattacharjee et al.

(10) Patent No.: US 9,152,634 B1
(45) Date of Patent: Oct. 6, 2015

(54) BALANCING CONTENT BLOCKS ASSOCIATED WITH QUERIES

(75) Inventors: Rajat Bhattacharjee, Mountain View, CA (US); Aranyak Mehta, Mountain View, CA (US); Benyu Zhang, Fremont, CA (US); Vivek Raghunathan, Fremont, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 12/980,956

(22) Filed: Dec. 29, 2010

Related U.S. Application Data

(60) Provisional application No. 61/357,941, filed on Jun. 23, 2010.

(51) Int. Cl.
*G06F 17/30* (2006.01)
*G06F 7/08* (2006.01)

(52) U.S. Cl.
CPC ............ *G06F 17/30029* (2013.01); *G06F 7/08* (2013.01); *G06F 17/3005* (2013.01)

(58) Field of Classification Search
CPC .... G06F 17/30029; G06F 17/005; G06F 7/08
USPC ................................................. 707/766, 736
See application file for complete search history.

(56) References Cited

U.S. PATENT DOCUMENTS

| 7,617,205 | B2 | 11/2009 | Bailey et al. |
| 2005/0149396 | A1* | 7/2005 | Horowitz et al. ............... 705/14 |
| 2005/0246736 | A1* | 11/2005 | Beyda et al. .................... 725/35 |
| 2006/0224554 | A1 | 10/2006 | Bailey et al. |
| 2008/0109285 | A1* | 5/2008 | Reuther et al. .................... 705/7 |
| 2009/0063461 | A1* | 3/2009 | Wang et al. ....................... 707/5 |
| 2009/0204636 | A1* | 8/2009 | Li et al. .................... 707/103 Y |
| 2010/0010959 | A1* | 1/2010 | Broder et al. ...................... 707/2 |

OTHER PUBLICATIONS

Budget Optimization in Search-Based Advertising Auctions Joh Feldman, Martin Pal, S. Muthukrishnan, & Cliff Stein ACM (2007).*

* cited by examiner

*Primary Examiner* — Hosain Alam
*Assistant Examiner* — Bruce Witzenburg
(74) *Attorney, Agent, or Firm* — Fish & Richardson P.C.

(57) ABSTRACT

Methods, systems, and apparatus, including computer programs encoded on a computer storage medium, for enhancing selecting relevant and diverse advertisements. In one aspect, a method includes receiving an initial query, selecting one or more additional queries relating to the initial query, identifying one or more content items for each query, forming a content block, balancing each content block, and providing, for each query, a content block along with search results associated with the initial query for display or other processing by a device.

19 Claims, 19 Drawing Sheets

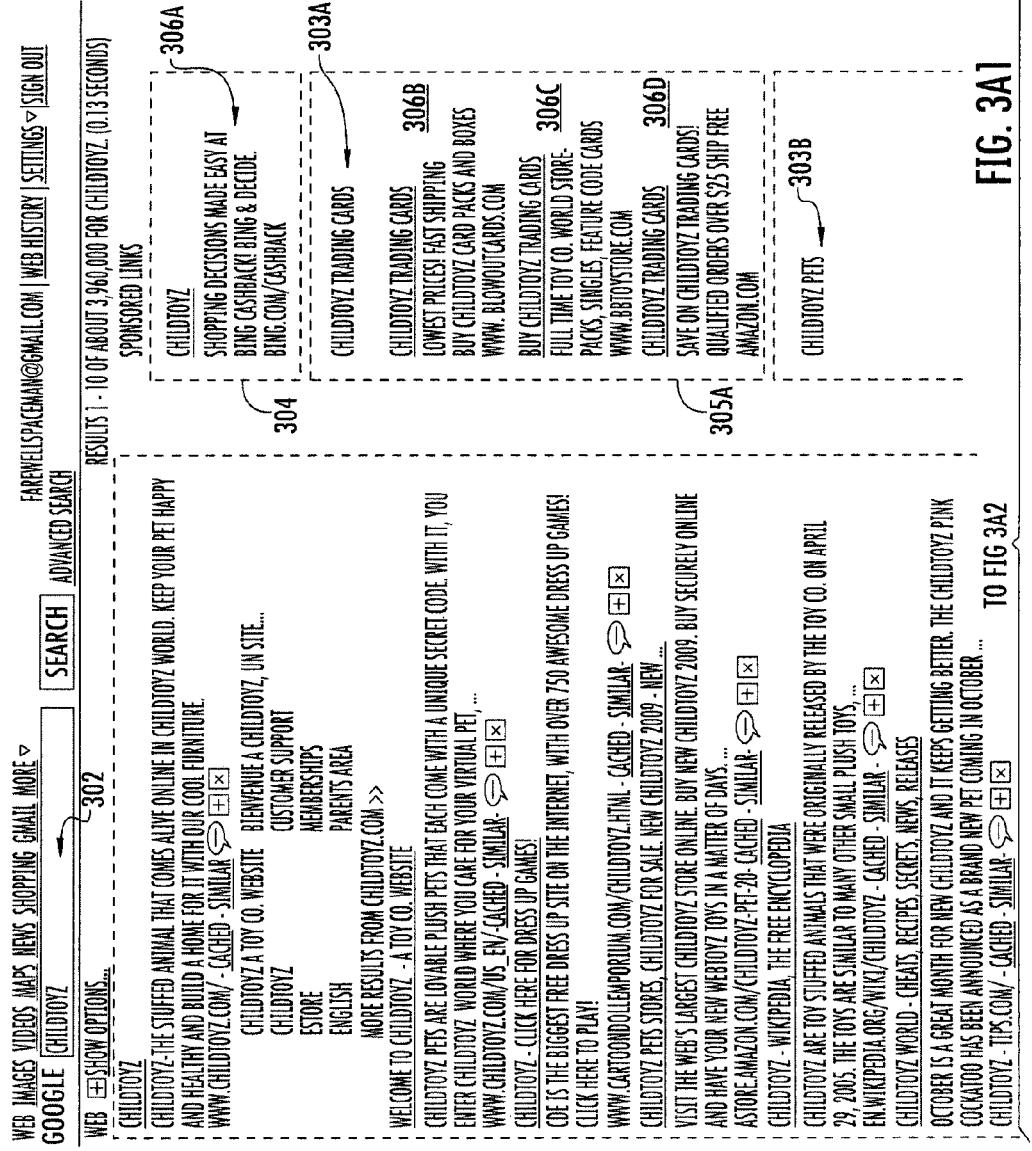
FIG. 3A1

FIG. 3A2

FROM FIG 3A1

CHILDTOYZ JR.
WHAT IS CHILDTOYZ JR.? CHILDTOYZ JR. PETS ARE LOVABLE PLUSH ANIMALS THAT EACH COME WITH A
UNIQUE PET CODE. WELCOME TO CHILDTOYZ JR. HOME - NEW MEMBER...
WWW.CHILDTOYZJR.COM/ - CACHED - SIMILAR - 🔍 ⊞ ☒

CHILDTOYZ INSIDER -- CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME
STRATEGIES FOR CHILDTOYZ WORLD.
WWW.CHILDTOYZINSIDER.COM/ - 54 MINUTES AGO - CACHED - SIMILAR - 🔍 ⊞ ☒

AMAZON.COM: CHILDTOYZ: TOYS & GAMES
BESTSELLERS IN CHILDTOYZ. CHILDTOYZ BROWN SPRINGER SPANIEL. OUR PRICE: $6.70. CHILDTOYZ HM222
SILVERSOFT CAT PLUSH ANIMAL. OUR PRICE: $6.20. CHILDTOYZ RACCOON ...
WWW.AMAZON.COM/CHILDTOYZ/B?IE=UTF8&NODE... - CACHED - SIMILAR - 🔍 ⊞ ☒

THE #1 WEBSITE FOR EVERYTHING ABOUT CHILDTOYZ
CHILDTOYZ HUB IS THE FUNNEST PLACE TO BE FOR NEWEST INFORMATION ON THE WORLD OF CHILDTOYZ AND
LIL TOYZ.
WWW.CHILDTOYZHUB.COM/ - CACHED - SIMILAR - 🔍 ⊞ ☒

NEWS RESULTS FOR CHILDTOYZ
🗞 RESTAURANT TO OFFER EXCLUSIVE CHILDTOYZ PET - 1 DAY AGO
OPOSSUM IS THE NEW ULTRA-SOFT PLUSH TOY FROM CHILDTOYZ AND WILL BE AVAILABLE ONLY AT
RESTAURANT STARTING ON SEPTEMBER 11TH. "IT IS A TREMENDOUS HONOR TO ...
PR-USA.NET (PRESS RELEASE) - 25 RELATED ARTICLES »

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES    CHILDTOYZ LOGIN    CHILDTOYZ CLUB    CHILDTOYZ 2008

⊞ ADD A RESULT - SEE ALL MY SEARCHWIKI NOTES - SEE ALL NOTES FOR THIS SEARCHWIKI - LEARN MORE

GOOOOOOOOOGLE △
1 2 3 4 5 6 7 8 9 10   NEXT

WE SELL CHILDTOYZ PETS HERE    306E
FULL TIME TOY CO. CHILDTOYZ WORLD STORE
-ALL NEW PLUSH, CHARMS, CARDS & MORE
WWW.BBTOYSTORE.COM

CHILDTOYZ PETS    306F
FIND CHILDTOYZ PETS
AT WEBCRAWLER.COM
WWW.WEBCRAWLER.COM

305B

301

CHILDTOYZ CHARMS    — 303C
CHILDTOYZ CHARMS
BID ON CHILDTOYZ CHARMS NOW!
FIND STUFFED ANIMALS.    306G
WWW.EBAY.COM

CHILDTOYZ CHARMS    306H
10,000+ CHILDTOYZ CHARMS
SHOP, COMPARE AND SAVE AT PRONTO.
CHARM.PRONTO.COM

305C

300

[CHILDTOYZ]    [SEARCH]

SEARCH WITHIN RESULTS - LANGUAGE TOOLS - SEARCH HELP - DISSATISFIED? HELP US IMPROVE - TRY GOOGLE EXPERIMENTAL
GOOGLE HOME - ADVERTISING PROGRAMS - BUSINESS SOLUTIONS - PRIVACY - ABOUT GOOGLE

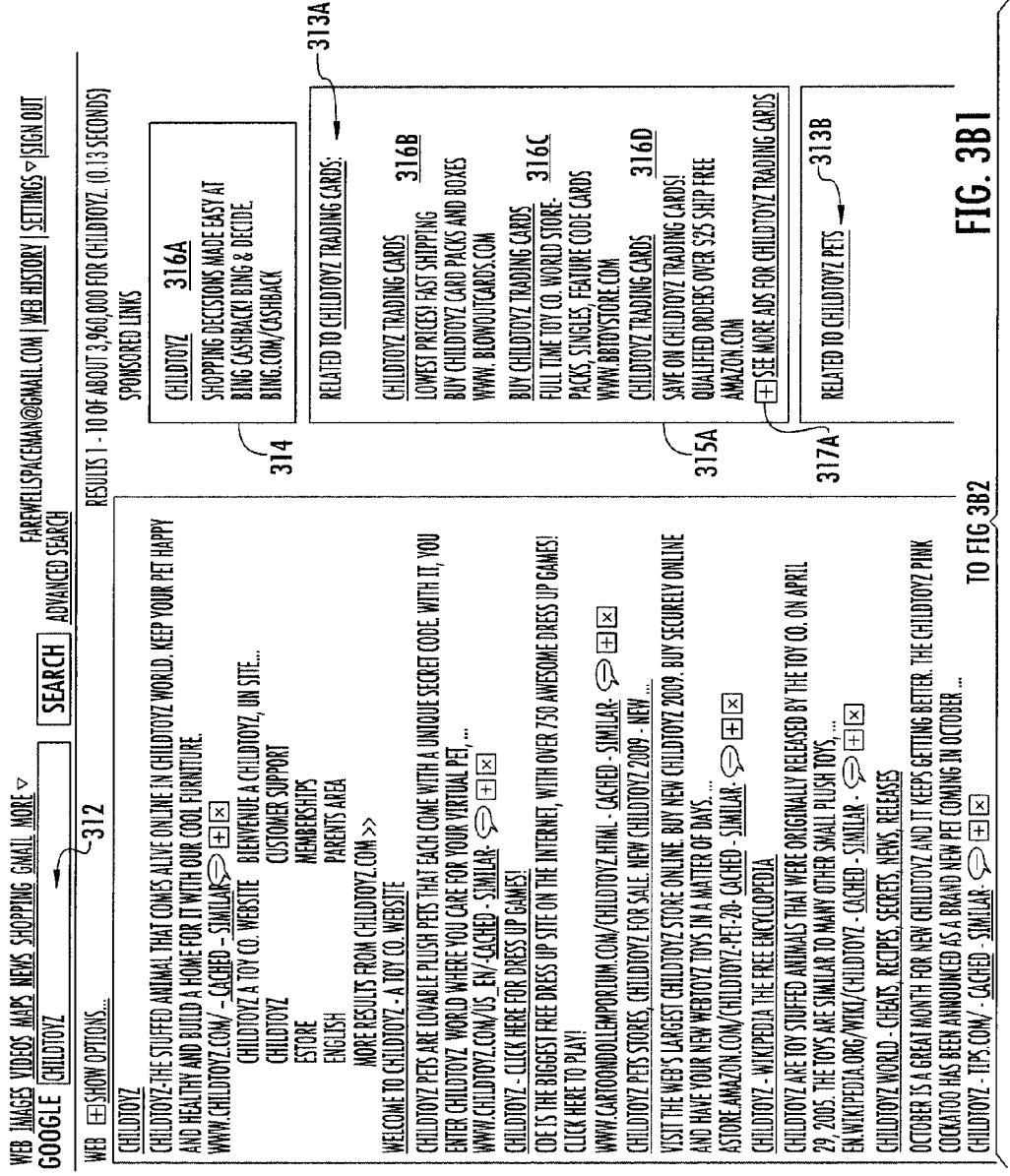
FIG. 3B1

FIG. 3B2

FROM FIG 3B1

CHILDTOYZ JR.
WHAT IS CHILDTOYZ JR.? CHILDTOYZ JR. PETS ARE LOVABLE PLUSH ANIMALS THAT EACH COME WITH A
UNIQUE PET CODE. WELCOME TO CHILDTOYZ JR. HOME. - NEW MEMBER...
WWW.CHILDTOYZJR.COM/ - CACHED - SIMILAR ⊕ ⊞ ☒

CHILDTOYZ INSIDER — CHILDTOYZ NEWS, INFO, RECIPES & FORUMS!
SEP 11, 2009 ... FREE CHILDTOYZ, SECRET RECIPES, CHAT FORUM, NEWS, TIPS AND TRICKS AND GAME
STRATEGIES FOR CHILDTOYZ WORLD.
WWW.CHILDTOYZINSIDER.COM/ - 54 MINUTES AGO - CACHED - SIMILAR ⊕ ⊞ ☒

AMAZON.COM: CHILDTOYZ: TOYS & GAMES
BESTSELLERS IN CHILDTOYZ. CHILDTOYZ BROWN SPRINGER SPANIEL. OUR PRICE: $6.70. CHILDTOYZ HM222
SILVERSOFT CAT PLUSH ANIMAL. OUR PRICE: $6.20. CHILDTOYZ RACCOON ...
WWW.AMAZON.COM/CHILDTOYZ/B?IE=UTF8&NODE... - CACHED - SIMILAR ⊕ ⊞ ☒

THE #1 WEBSITE FOR EVERYTHING ABOUT CHILDTOYZ
CHILDTOYZ HUB IS THE FUNNEST PLACE TO BE FOR NEWEST INFORMATION ON THE WORLD OF CHILDTOYZ AND
LIL TOYZ.
WWW.CHILDTOYZHUB.COM/ - CACHED - SIMILAR ⊕ ⊞ ☒

NEWS RESULTS FOR CHILDTOYZ
RESTAURANT TO OFFER EXCLUSIVE CHILDTOYZ PET - 1 DAY AGO
OPOSSUM IS THE NEW ULTRA-SOFT PLUSH TOY FROM CHILDTOYZ AND WILL BE AVAILABLE ONLY AT
RESTAURANT STARTING ON SEPTEMBER 11TH. "'TIS A TREMENDOUS HONOR TO ...
PR-USA.NET (PRESS RELEASE) - 25 RELATED ARTICLES»

SEARCHES RELATED TO: CHILDTOYZ
CHILDTOYZ CHEATS    FUTURE CHILDTOYZ    CHILDTOYZ CODES    CHILDTOY.COM TOY CO. WEBSITE
CHILDTOYZ RECIPES   CHILDTOYZ LOGIN     CHILDTOYZ CLUB     CHILDTOY 2008

GOOOOOOOOOGLE △
1 2 3 4 5 6 7 8 9 10    NEXT

WE SELL CHILDTOYZ PETS HERE    316E
FULL TIME TOY CO. CHILDTOYZ WORLD STORE
-ALL NEW PLUSH, CHARMS, CARDS & MORE
WWW.BRTOYSTORE.COM

CHILDTOYZ PETS    316F
FIND CHILDTOYZ PETS
AT WEBCRAWLER.COM
WWW.WEBCRAWLER.COM

⊕ SEE MORE ADS FOR CHILDTOYZ TRADING PETS    313C

RELATED TO CHILDTOYZ CHARMS:

CHILDTOYZ CHARMS
BID ON CHILDTOYZ CHARMS NOW!
FIND STUFFED ANIMALS.    316G
WWW.EBAY.COM

CHILDTOYZ CHARMS    316H
10,000+ CHILDTOYZ CHARMS
SHOP, COMPARE AND SAVE AT PRONTO.
CHARM.PRONTO.COM

⊕ SEE MORE ADS FOR CHILDTOYZ CHARMS.

315B
311
317B
315C
317C
310

[CHILDTOYZ]    [SEARCH]

⊕ ADD A RESULT - SEE ALL MY SEARCHWIKI NOTES - SEE ALL NOTES FOR THIS SEARCHWIKI - LEARN MORE

SEARCH WITHIN RESULTS - LANGUAGE TOOLS - SEARCH HELP - DISSATISFIED? HELP US IMPROVE - TRY GOOGLE EXPERIMENTAL
GOOGLE HOME - ADVERTISING PROGRAMS - BUSINESS SOLUTIONS - PRIVACY - ABOUT GOOGLE

FIG. 3E

BALANCING CONTENT BLOCKS ASSOCIATED WITH QUERIES

CROSS-REFERENCE TO RELATED APPLICATION

This application claims priority to U.S. Provisional Application No. 61/357,941, filed on Jun. 23, 2010. The disclosure of the prior application is considered part of and is incorporated by reference in the disclosure of this application.

BACKGROUND

This specification generally relates to content presentation.

A search engine results page provides a user of a search engine with a list of search results that the search engine identifies in response to a search query. Search engine results pages may include advertisements that are relevant to the search query. Advertisements, which are also referred to as "sponsored listings," are typically displayed on the right hand side of a search engine results page or directly above the search results, although other locations are possible.

The user, the search engine provider, and the advertiser may all benefit when the user selects or otherwise interacts with an advertisement that is displayed on the search engine results page. When the search engine results page includes advertisements that are not interesting to the user, the user may become annoyed and quickly navigate away without selecting or interacting with an advertisement. As a result, the opportunity for the user, the search engine provider, and the advertiser to benefit may be reduced.

SUMMARY

In general, one innovative aspect of the subject matter described in this specification may be embodied in methods for selecting and providing advertisements that are relevant to a user of a search engine. To accomplish this, an ad selector engine may select candidate advertisements that are targeted to an initial query (where the query can include one or more query terms) that the user has submitted, as well as candidate advertisements that are targeted to one or more additional queries (sometimes referred to here as "revised queries," "revised query terms," "suggested queries," or "suggested query terms") that are automatically derived from the initial query. An auction engine may dynamically perform a competition among advertisers associated with candidate advertisements, to select a subset of the candidate advertisements. The search engine returns search results that are used to assemble a search engine results page that, among other things, an advertisement box that references the initial query and advertisements from the subset that have been selected for the initial query, and one or more advertisement boxes that reference the additional queries and advertisements from the subset that have been selected for the additional queries.

As used by this specification, a "search query" (also including, for example, a "voice query" when spoken instead of initially input as text) includes one or more query terms that a user submits to a search engine when the user requests the search engine to execute a search for information, where a "term" or a "query term" includes one or more whole or partial words, characters, or strings of characters. Among other things, a "result" (or a "search result") of the search query includes a Uniform Resource Identifier (URI) that references a resource that the search engine determines to be responsive to the search query. The search result may include other things, such as a title, preview image, user rating, map or directions, description of the corresponding resource, or a snippet of text that has been automatically or manually extracted from, or otherwise associated with, the corresponding resource.

In general, another innovative aspect of the subject matter described in this specification may be embodied in methods for balancing candidate advertisements targeted to an initial query and candidate advertisements targeted to one or more additional queries. In some cases, a query may be determined to be associated with too many or too few candidate advertisements relative to other queries. By broadening or narrowing a search for relevant advertisements for the query by the ad selector engine, the query may be associated with a similar number of advertisements relative to the other queries.

In general, another innovative aspect of the subject matter described in this specification may be embodied in methods that include the actions of receiving an initial query; selecting one or more additional queries relating to the initial query; identifying one or more content items for each query, the one or more content items forming a content block; balancing each content block; and providing, for each query, a content block along with search results associated with the initial query for display or other processing by a device.

These and other embodiments may each optionally include one or more of the following features. In various examples, the initial query includes one or more query terms. The one or more additional queries include one or more terms from the initial query. The one or more additional queries include one or more terms from the initial query and one or more additional terms. The one or more additional queries include at least a portion of the initial query. The one or more additional queries are contextually relevant to the initial query. The one or more additional queries represent queries that have historically been entered by users after having entered the initial query. Requesting includes specifying a closeness criteria which defines a semantic distance between subject matter associated with each query and identified content items for each query. Duplicate content items are identified. Content items are identified for which a content item provider has expressed an intention to disassociate the content items from one or more respective queries. A number of content items that are associated with a given block are compared to a number of content items that are associated with one or more other blocks. If a content block has too few content items, more content items are requested to be associated with a respective query. If a content block has too many content items, fewer content items are requested to be associated with a respective query. Balancing includes having a same or similar number of content items being associated with each query. Balancing includes proportionally representing content item providers among content items. Balancing includes requesting a broadening of a search for relevant content items for queries that have too few items in an associated block. Balancing includes requesting a narrowing of a search for relevant content items for queries that have too many content items in an associated block. Candidate content items and refined candidate content items are provided with respective queries to an auction engine. Candidate content items and refined candidate content items are provided with respective queries to a browser.

Particular embodiments of the subject matter described in this specification may be implemented to realize none, one or more of the following advantages. Advertisements presented to users on search engine results pages are likely to be more interesting to the user, improving the overall search experience. The advertiser may increase their sales opportunities, and the search engine provider may receive additional revenue, as more users select the advertiser's advertisements. The search engine may generate fewer search engine results pages that include no advertisements. By displaying advertisements relating to multiple query terms, ad relevance and ad response rates may be improved. Users that might not otherwise manually refine query terms may be encouraged to interact with the search engine through a visual query refinement mechanism. By balancing advertisements associated with queries and by removing duplicate advertisements, a diverse selection of advertisements may be presented to users.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 3A to 3E show example search engine results pages.

Like reference symbols in the various drawings indicate like elements.

DETAILED DESCRIPTION

Briefly, a system selects and provides one or more content items (e.g., advertisements or "ads") that are relevant to a user of the system. Reference will be made in the following materials to providing ads, however other forms of content items can be provided. In some implementations, to accomplish this, an ad selector engine may select candidate advertisements that are targeted to an initial query that the user has submitted, as well as candidate advertisements that are targeted to one or more additional queries that are automatically derived from the initial query. An auction engine may dynamically perform a competition, i.e., an auction, among advertisers associated with candidate advertisements, to select one or more subsets of the candidate advertisements to include in an ad block.

Figure 1:
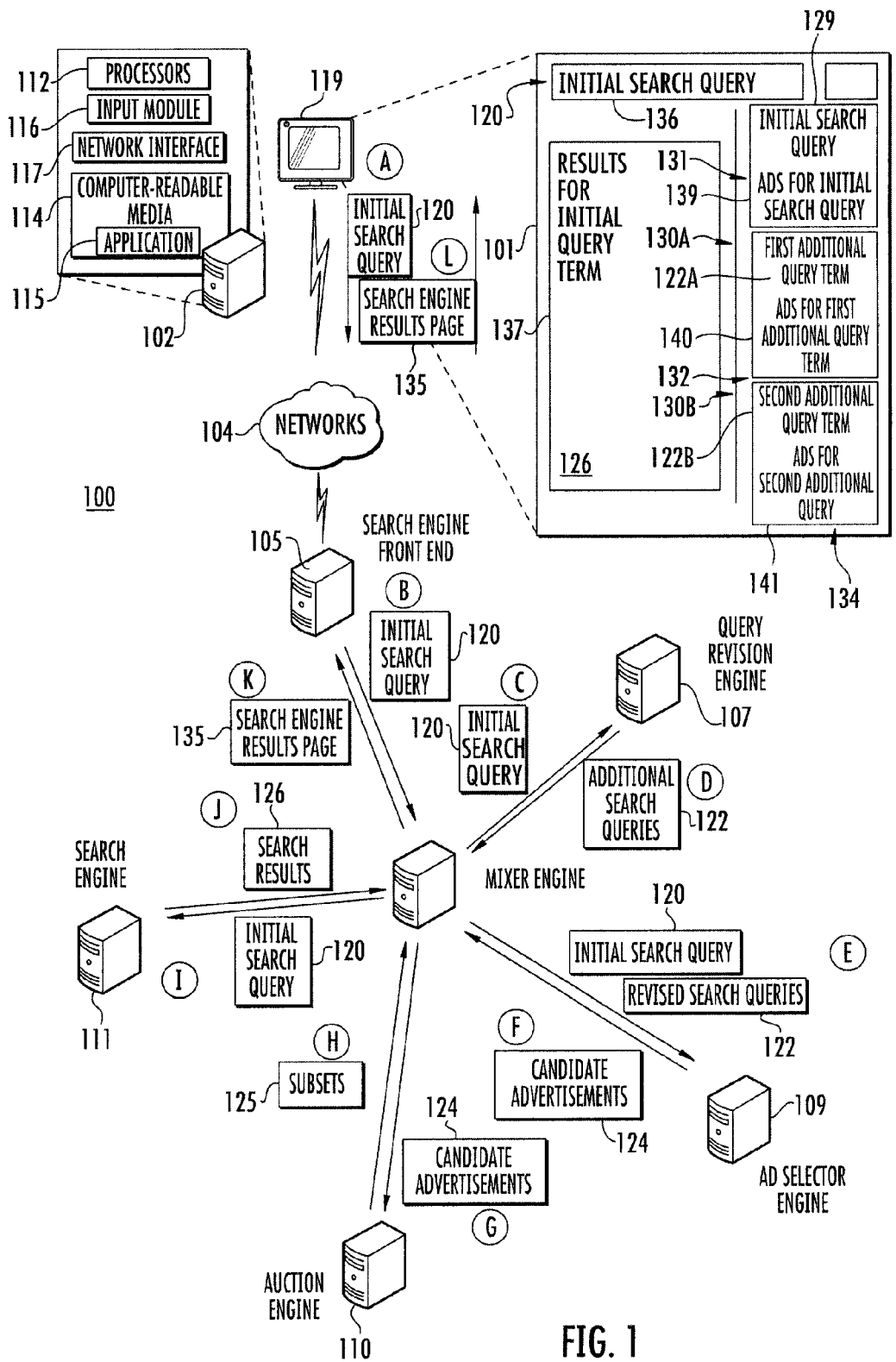
FIG. 1 is a diagram of an example system that can select content on a search engine results page.

FIG. 1 is a diagram of an example system 100 that can provide content items on a search engine results page 101. FIG. 1 also illustrates a flow of data within the system 100 during states (a) to (m), where the states (a) to (m) may occur in the illustrated sequence, or they may occur in a sequence that is different than is illustrated.

The search engine 111 returns search results that are used by a mixer engine 106 to assemble the search engine results page 101. Among other things, the search engine results page 101 references an initial query 120 (e.g., using reference 129) and additional queries 122 (e.g., using reference 130), and that includes advertisements 131 from a subset 125 that have been selected for the initial query and advertisements 132, 134 from the subset 125 that have been selected for the additional queries 122.

In more detail, the system 100 includes a client device 102 that communicates over one or more networks 104 with a search engine front end (or a "gateway server") 105, the mixer engine 106, the query reviser engine 107, the ad selector engine 109, the auction engine 110, the search engine 111, and, optionally, other engines. As used by this specification, an "engine" (or "software engine") refers to a software-implemented input/output system that provides an output that is different than the input. An engine may be an encoded block of functionality, such as a library, a platform, Software Development Kit ("SDK") or an object. The networks 104 may include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination thereof.

The client device 102, the search engine front end 105, the mixer engine 106, the query reviser engine 107, the ad selector engine 109, the auction engine 110, and the search engine 111 may each be implemented on any appropriate type of computing device (e.g., servers, mobile phones, tablet computers, music players, e-book readers, laptop or desktop computers, PDAs, smart phones, or other stationary or portable devices) that includes one or more processors and computer readable media. Among other components, the client device includes one or more processors 112, computer readable media 114 that store software applications 115 (e.g. a browser or layout engine), an input module 116 (e.g., a keyboard or mouse), communication interface 117, and a display 119. The computing device or devices that implement the search engine front end 105, the mixer engine 106, the query reviser engine 107, the ad selector engine 109, the auction engine 110, and the search engine 111 may include similar or different components.

Two or more of the search engine front end 105, the mixer engine 106, the query reviser engine 107, the ad selector engine 109, the auction engine 110, and the search engine 111 may be implemented on the same computing device, or on different computing devices. Because the search engine results page 101 is generated based on the collective activity of the search engine front end 105, the mixer engine 106, the query reviser engine 107, the ad selector engine 109, the auction engine 110, and the search engine 111, the user of the client device 101 may refer to these engines collectively as a "search engine." This specification, however, refers to the search engine 111, and not the collection of engines, as the "search engine," since the search engine 111 identifies the search results in response to the user-submitted search query.

In general, the search engine front end 105 receives queries from client devices, and routes the queries to the appropriate engines so that search engine results pages may be generated. In some implementations, routing occurs by referencing static routing tables, or routing may occur based on the current network load of an engine, so as to accomplish a load balancing function. The search engine front end 105 also provides the resulting search engine results pages to the respective client devices. In doing so, the search engine front end 105 acts as a gateway, or interface between client devices and the search engine 111.

The mixer engine 106 temporarily stores and collates data that is generated by the various engines, and generates search engine results pages using this data. The mixer engine 106 determines the sequence in which to request data from various engines, and submits formatted requests and receives responses from the various engines according to the desired sequence. The sequence may be determined from a sequence table or chart, or from rules that specify how particular types of queries are to be processed, and that identify the various engines that are to generate portions of the data that make up a search engine results page.

The query reviser engine 107 applies query terms, i.e., the initial query, to various query revision models, to generate additional queries that, in some implementations, match a same or a similar context as an input query. Several example query revision strategies which may be used by the query reviser engine 107 are described in U.S. Pat. No. 7,617,205, issued Nov. 10, 2009, which is incorporated by reference in the entirety (including its FIGS. 1A and 1B, which are incorporated by reference in particular), and U.S. Pat. App. Pub. No. 2006/0224554, published Oct. 5, 2006 which is incorporated by reference in the entirety (including its FIGS. 1A and 1B, which are incorporated by reference in particular).

In some implementations, the additional queries are relevant to the initial query, yet at the same time the additional queries may be required to be diverse with each other. Additional query selection is described below. In other implementations, additional queries are generated by the query reviser engine 107 before the initial query 120 is received.

The ad selector engine 109 selects candidate advertisements that are relevant to a query. This specification refers to an advertisement being "targeted" to a query when, for example, the advertisement is associated with a list of keywords that match one or more portions of the query. Accordingly, selecting a candidate advertisement that is targeted to a query may include generating n-grams from the query, and accessing a look-up table that cross-references n-grams with advertisements that are targeted to, or are otherwise associated with, a particular n-gram.

The mixer engine 106 may filter the candidate advertisements 124 before identifying the candidate advertisements to the auction engine 110. For instance the mixer engine 106 may filter duplicate advertisements, too many advertisements from the same advertiser, advertisements that have low satisfaction or interest scores, black-listed advertisements, or advertisements that are determined to be inappropriate for the user, advertisements that the user has indicated in their user preferences that they do not want to see, too many advertisements for the same query term, or other advertisements.

When an insufficient number of advertisements are selected, i.e. where the number of advertisements selected for a particular query does not satisfy a predetermined or dynamically determined threshold (e.g., "0", or "3"), the ad selector engine 109 may select additional advertisements, for example by broadening the advertisement selection parameters. Similarly, when too many advertisements are selected, i.e., where the number of advertisements selected for a particular query exceeds a different predetermined or dynamically determined threshold (e.g., "10", or "100"), the ad selector engine 109 may filter the selected advertisements, for example by narrowing the advertisement selection parameters. The query reviser engine 107 may also filter the candidate additional queries before identifying the additional queries to other components of the system in an attempt to filter out unhelpful suggestions prior to identifying ads.

The auction engine 110 selects a subset 125 of the candidate advertisements 124. For example, for each query terms, the auction engine 110 may perform a competition, i.e., an auction, in real-time to receiving the candidate advertisements 124, to select the top n advertisements for each query (i.e., initial query and each candidate query). Selecting a subset of the candidate advertisements may include selecting the same number of advertisements for each query, selecting different numbers of advertisements for each query, or determining, for a particular query, that no advertisements should be selected. In some implementations, because the suggested queries that were used to select the advertisements are diverse, and because the ad selector engine 109 may filter the candidate advertisements 124, the candidate advertisements 124 in the subset 125 of advertisements may also be diverse.

The search engine 111 searches for information that is accessible on the networks 104, thereby generating search results. The search engine 111 may perform a search using the initial query 120 only, using the initial query 120 and one or more of the additional queries 122, or using the initial query 120 and other data.

For privacy protection, any historical, behavioral or other data gathered can be made on an opt-in basis. Gathered data can be anonymized by various means. For example, the search engine 111 or query reviser engine 107 can provide additional query suggestions that are both relevant to the user's history while also protecting the user's privacy. For example, search history data can be anonymized for privacy protection, so that the data, if compromised, cannot be associated with a particular user or user identifier. Various anonymization processes, such as hashing, encryption and obfuscation techniques, can be used to ensure that subject privacy is protected.

In FIG. 1, a user of the client device 102 submits an initial search query 120 to the search engine front end 105 over the networks 104, during state (a). The user may submit the initial search query 120 by initiating a search dialogue on the client device 102, speaking or typing the terms of the initial search query 120, then pressing a search initiation button or control on the client device 102. The client device formulates the initial search query 120, and transmits the initial search query 120 over the networks 104.

Although this specification refers to the initial query 120 as an "initial" query, such reference is merely intended to distinguish this query from other queries, such as the additional, alternative, revised or suggested queries that are described below with respect to states (d) to (m). To be sure, the designation of the initial query 120 as "initial" is not intended to require the initial query 120 to be the first query that is entered by the user, or to be a query that is manually entered. For example, the initial query 120 may be the second or subsequent query entered by the user, or the initial query 120 may be automatically derived (e.g., by the query reviser engine 107) or may be modified based upon prior queries entered by the user, location information, and the like.

Furthermore, although state (a) describes an example where a user submits a search query, in other examples another type of request may be issued, such as a request for an advertisement. In a syndication example, an advertisement request may result in an ad block being sent to a user to be published on a page of content.

During state (b), the search engine front end 105 receives the initial query 120, and communicates the initial query 120 to the mixer engine 106. The search engine front end 105 may also append a flag to the initial query 120 to indicate that multiple advertisement blocks are to be included in the search engine results page 101. Alternatively, the mixer engine 106 may assign such a flag, or may attempt to generate advertisement blocks for all queries.

The mixer engine 106 obtains the initial query 120 and, during state (c), transmits the initial query 120 to the query reviser engine 107. The mixer engine 106 temporarily stores the initial query 120 and information identifying the client device 102, so that the resulting search engine results page 101 may be transmitted back to the client device 102.

During state (d), the query reviser engine 107 generates one or more additional queries 122 that relate to the initial query 120, and transmits the additional queries 122 to the mixer engine 106. In some implementations, the additional queries may be selected based the relevance of the additional queries to the initial query 120, based an extent to which the selected additional queries are diverse with each other, and/or based on the commerciality of the additional queries, i.e., the business value of the additional queries to the search engine provider. Generating additional queries may include generating candidate additional queries, and selecting a subset of the candidate additional queries based on any number of factors, including relevancy, diversity and/or commerciality. The mixer engine 101 temporarily stores information identifying the initial query 120 and the additional queries 122.

During state (e) the mixer engine 106 transmits the initial search query 120 and the additional queries 122 to the ad selector engine 109. The ad selector engine 109 selects one or more candidate advertisements that are targeted to the initial search query 120, and one or more candidate advertisements that are targeted to the additional queries 122. For example, the ad selector engine 109 may select one or more candidate advertisements 124 that are targeted to each of the additional queries 122, where some of the selected advertisements 124 may be targeted to more than one of the queries. The candidate ads for each query may be identified as candidates based on, for example, relevance to the query, ad quality, non-duplicative quality of the ad or advertiser, and/or a threshold number of ads to be selected as candidates. During state (f), the ad selector engine 109 transmits the selected advertisements 124, or information referencing the selected advertisements 124, to the mixer engine 106. The mixer engine 106 temporarily stores information referencing the selected advertisements 124.

During state (g), the mixer engine 106 transmits the selected advertisements, or information referencing the selected advertisements, to the auction engine 110. The auction engine 110 selects one or more subsets 125 of the advertisements using an auction such as, for example, a modified second price auction determining bids based on factors such as, but not limited to, advertiser maximum bid amounts, ad quality, ad click through rates, and, during state (h), transmits the advertisements of the subsets 125, or information referencing the advertisements of the subset 125, to the mixer engine 106. The mixer engine 106 temporarily stores information referencing the advertisements of the subset 125.

During state (i), the mixer engine 106 transmits the initial query 120 and, optionally, the additional queries 122 to the search engine 111. The search engine 111 generates search results that it identifies as being relevant to the initial query 120 and, if provided, one or more of the additional queries 122. In some implementations, during state (j), the search engine transmits the search results 126 to the mixer engine 106, which generates the search engine results page 101 that includes a reference 129 to the initial query 120 and references 130A-B to the additional queries, and that includes advertisements 131 from the subset 125 that are targeted to the initial query 120, advertisements 132 from the subset 125 that are targeted to a first additional query 122A, and advertisements 134 from the subset 125 that are targeted to a second additional query 122B.

The mixer engine 106 generates the search engine results page 101 using the information that it temporarily stored during states (b) to (k). In some implementations the search results may be generated while or before the auction engine 110 generated the subsets 125.

During state (k), the mixer engine 106 transmits code 135 (e.g., HyperText Markup Language code or eXtensible Markup Language code) for the search engine results page 101 to the search engine front end 105 which, during state (l), transmits the code 135 to the client device 102 over the networks 104, so the client device 102 can display the search engine results page 101.

The client device 102 invokes the code 135 (e.g., using a layout engine) and, as a result, displays the search engine results page 101 on the display 119. The initial query 120 is displayed in a query box (or "search box") 136, located for example, on the top of the search engine results page 101, and the search results 126 are displayed in a search results block 137, for example on the left hand side of the search engine results page 101. In some implementations, the right hand side of the search engine results page 101 defines an advertising region, including the reference 129 to the initial query 120, the reference 130A to the first additional query 122A, and the reference 130B to the second additional query 122B.

A first advertisement block 139 includes the reference 129 to the initial query 120 and the advertisements 131 of the subset 125 that are targeted to the initial query 120. A second advertisement block 140 includes the reference 130A to the first additional query 122A and the advertisements 132 of the subset 125 that are targeted to the first additional query 122A. A third advertisement block 141 includes the reference 130B to the second additional query 122B and the advertisements 134 of the subset 125 that are targeted to the second additional query 122B.

The references 129, 130 may be textual or graphical references, or the references 129, 130 may include hyperlinks that, when selected, cause the client device 102 to submit a new initial search query that includes, as a query term(s), the query associated with the hyperlink. In doing so, a reference 130 to an additional query 122 may be used to initiate a new search query using the additional query 122.

Figure 2A:
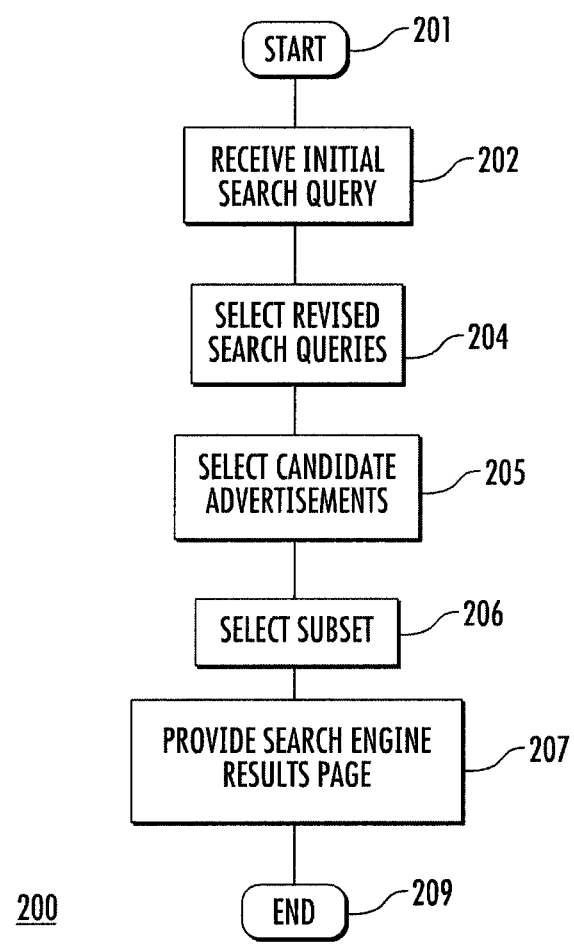
FIGS. 2A and 2B are flowcharts of example processes.

FIG. 2A is a flowchart of an example process 200. Briefly, the process 200 includes receiving an initial query, selecting one or more additional queries that relate to the initial query, selecting one or more advertisements that are relevant to the initial query, and one or more advertisements that are relevant to each additional query, selecting a subset of the advertisements, and providing a search engine results page that includes a reference to the initial query and to each additional query, and that includes advertisements from the subset that are targeted to the initial query, and advertisements from the subset that are targeted to each additional query.

In more detail, when the process 200 begins (201), an initial query is received (202). The initial query may be included in a search query (e.g., a text-based query, a voice query, or an image query) that the user submits through a client device, such as a desktop computer or a smart phone. Other data, such as context data, browser header data, previous user queries, location data, user interest data, web history, and the like, may also be received with the initial query.

One or more additional queries that relate to the initial query are selected (204). Revised query terms may be obtained by applying an initial query to a query revision model that identifies additional queries that match a same context as the initial query. For example, additional queries may be obtained by applying a synonym model which replaces portions of the initial query with synonyms of those portions.

Selecting additional queries may include generating multiple candidate additional queries, and filtering or otherwise excluding particular candidate additional queries. For instance, as a result of applying a semantic drift detection process to a particular candidate additional query, a query reviser engine may determine that semantic drift has occurred, and the particular candidate additional query may be filtered. Duplicate candidate additional queries, candidate additional queries that do not exhibit sufficient diversity or commerciality i.e., as reflected in a diversity or commerciality score, or other candidate additional queries may also be filtered when selecting additional queries.

In some implementations, one or more advertisements that are relevant to the initial query are selected, as are one or more advertisements that are relevant to each additional query (205). Selecting an advertisement may include selecting advertisements that are associated with keywords that make up the query, and/or filtering advertisements that are unlikely to be selected by the user (e.g., duplicate or inappropriate advertisements).

A subset of the advertisements is selected (206). Selecting the subset may include selecting a number n of advertisements to be shown in a display block for each query (e.g., "3" for each query, or "1" for the initial query and "2" each for the additional queries), and selecting, as the subset, the n advertisements that have the highest quality. Other criteria can be used, such as advertisements whose advertisers have bid the highest amount of money to be displayed on the search engine results page. For example, the advertisements that have the highest effective ad ranking taking into account advertiser maximum bid (typically in cost-per-click terms), ad quality, ad click-through-rate (such as for each candidate ad relative to the next highest bid ad), and the like for each candidate ad in the subset of advertisements selected for potential display for a particular query. The selection of an advertisement for one query may affect the selection of an advertisement for another query, for example to exclude duplicate advertisements or advertisements from the same advertiser on the same search engine results page.

A search engine results page is provided that includes a reference to the initial query and to each additional query, and that includes advertisements from the subset that are targeted to the initial query, and advertisements from the subset that are targeted to each additional query (207), thereby ending the process 200 (209). The reference to each query may be a textual reference, or may be a hyperlink that, when selected, submits a new search query using a query (e.g., the terms) that is (are) identified by the hyperlink. A result may also be a script or link that activates a web-based application (including a specialized search application such as a map search, product search, video playback, Adobe Flash or HTML5 content, and the like), or client software when authorized by the user. The references and advertisements may be displayed in an advertising region of the search engine results page, such as along the bottom or the right hand side of the search engine results page.

In some implementations, the references to the initial query and to each additional query are displayed, but no advertisements are displayed for the initial query, or for one or more of the additional queries. In such implementations, a control on the search engine results page may be selected by the user to cause some advertisements, or additional advertisements, to be displayed. In some implementations, advertisements are displayed for the initial query and for the additional queries, but no reference is displayed for the initial query, or for one or more of the additional queries.

Figure 2B:
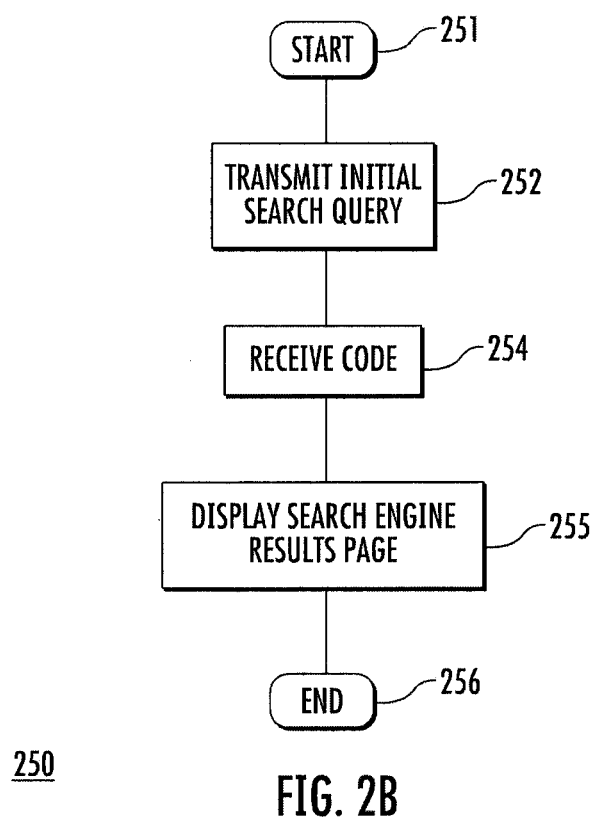

FIG. 2B is a flowchart of an example process 250. Briefly, the process 250 includes transmitting, by a client device, an initial query, receiving, by the client device, code for a search engine results page that includes a reference to the initial query and to one or more additional queries that relate to the initial query, and that further includes one or more advertisements that are relevant to the initial query, and one or more advertisements that are relevant to each additional query, and displaying, by the client device, the search engine results page.

In more detail, when the process 250 begins (251), a client device transmits an initial query (252). The search query may be transmitted over a network, for example when the user enters text into a query box on the user interface of the client device, and selects a control to submit the initial query. Alternatively, the initial query may be submitted without requiring a user interaction, for example when the client device recognizes a query term from the speech of a user, or uses the current location of the mobile device as a query term, and automatically submits the initial query to the search engine to obtain information for display before the user asks for it.

The client device receives code for a search engine results page that includes a reference to the initial query and to one or more additional queries that relate to the initial query, and that further includes one or more advertisements that are relevant to the initial query, and one or more advertisements that are relevant to each additional query (254). The code may be markup language code, such as HTML or XML code, that may be interpreted by a layout engine or a browser. The client device displays the search engine results page (255), thereby ending the process 250 (256).

FIGS. 3A to 3E show example search engine results pages 300, 310, 320, 330, and 340, respectively. The search engine results pages 300, 310, 320, 330, and 340 illustrate several ways in which the references to the queries and the various respective advertisements for each query may be arranged.

In FIG. 3A, the search engine results page 300 includes a search results block 301 that includes search results that a search engine has identified as being relevant to the initial query 302 (in the figure, "childztoyz"). The search engine results page also includes references 303A to 303C to each additional query (in the figure, "childztoyz trading cards," "childztoyz pets," and "childztoyz charms," respectively). The search engine results page 300 also includes an advertising block 304 that includes an advertisement 306A that is targeted to the initial query 302, an advertising block 305A that includes reference 303A and advertisements 306B-D that are targeted to the additional query 303A, an advertising block 305B that includes reference 306B and advertisements 306E-F that are targeted to the additional query 303B, and an advertising block 305C that includes reference 303C and advertisements 306G-H that are targeted to the additional query 303C. Notably, the search engine results page 300 does not include a reference that references the initial query 302 directly above the advertising block 304. The additional advertising blocks may be displayed in order of, for example, relevance of each additional query to the initial query, historical click through rate for the ads in each ad block, number of ads available for each ad block, random placement, and the like.

In FIG. 3B, the search engine results page 310 includes a search results block 311 that includes search results that a search engine has identified as being relevant to the initial query 312 (in the figure, "childztoyz"). The search engine results page also includes references 313A-C to each additional query (in the figure, "childztoyz trading cards," "childztoyz pets," and "childztoyz charms," respectively). The search engine results page 310 also includes an advertising block 314 that includes an advertisement 316A that is targeted to the initial query 312, an advertising block 315A that includes the reference 313A and advertisements 316B-D that are targeted to the additional query 313A, an advertising block 315B that includes reference 313B and advertisements 316E-F that are targeted to the additional query 313B, and an advertising block 315C that includes the reference 313C and advertisements 316G-H that are targeted to the additional query 313C.

Notably, and instead of merely including static textual data, the references 313A-C each define hyperlinks that, when selected by the user, initiate a new search query using the additional query. Moreover, the advertising blocks 315A-C include controls 317A-C, respectively, that, when selected, cause additional advertisements that are targeted to the corresponding additional queries to be obtained and/or displayed, or that cause some advertisements to be obtained or displayed if none are shown. Although the controls 317A-C are illustrated as user-selectable boxes that reveal additional content to the user (sometimes referred to as a "plusbox"), other types of controls may also be used.

Figure 3C:
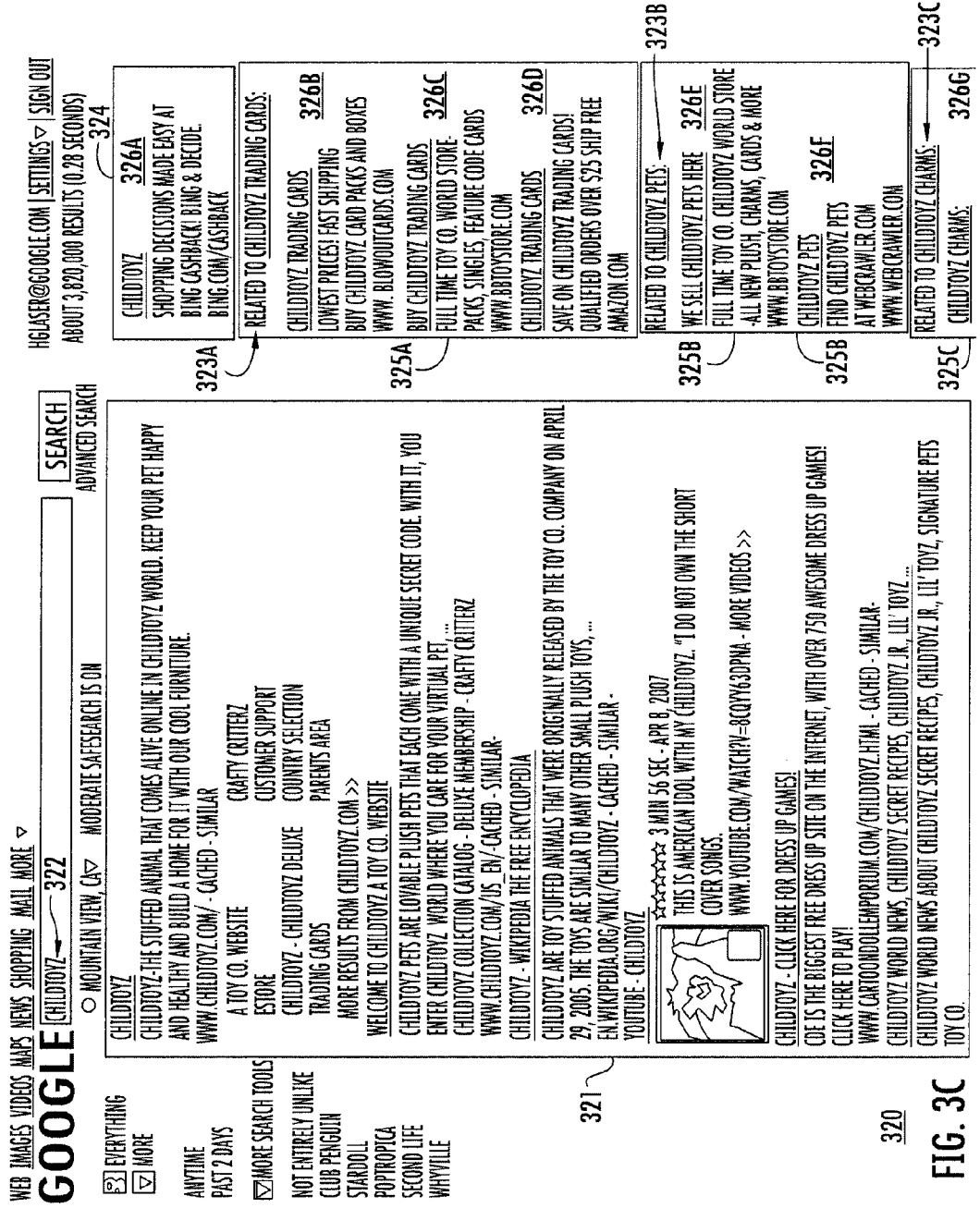

In FIG. 3C, the search engine results page 320 includes a search results block 321 that includes search results that a search engine has identified as being relevant to the initial query 322 (in the figure, "childztoyz"). The search engine results page also includes references 323A-C to each additional query (in the figure, "childztoyz trading cards," "childztoyz pets," and "childztoyz charms," respectively). The search engine results page 320 also includes an advertising block 324 that includes an advertisement 326A that is targeted to the initial query 322, an advertising block 325A that includes the reference 323A and advertisements 326B-D that are targeted to the additional query 323A, an advertising block 325B that includes the reference 323B and advertisements 326E-F that are targeted to the additional query 323B, and an advertising block 325C that includes the reference 323C and advertisement 326G that is targeted to the additional query 323C. Notably, the references 323A-C are, in some embodiments, displayed in a larger font than the references 313A-C of FIG. 3B, to allow the user to see the additional queries more easily.

Figure 3D:
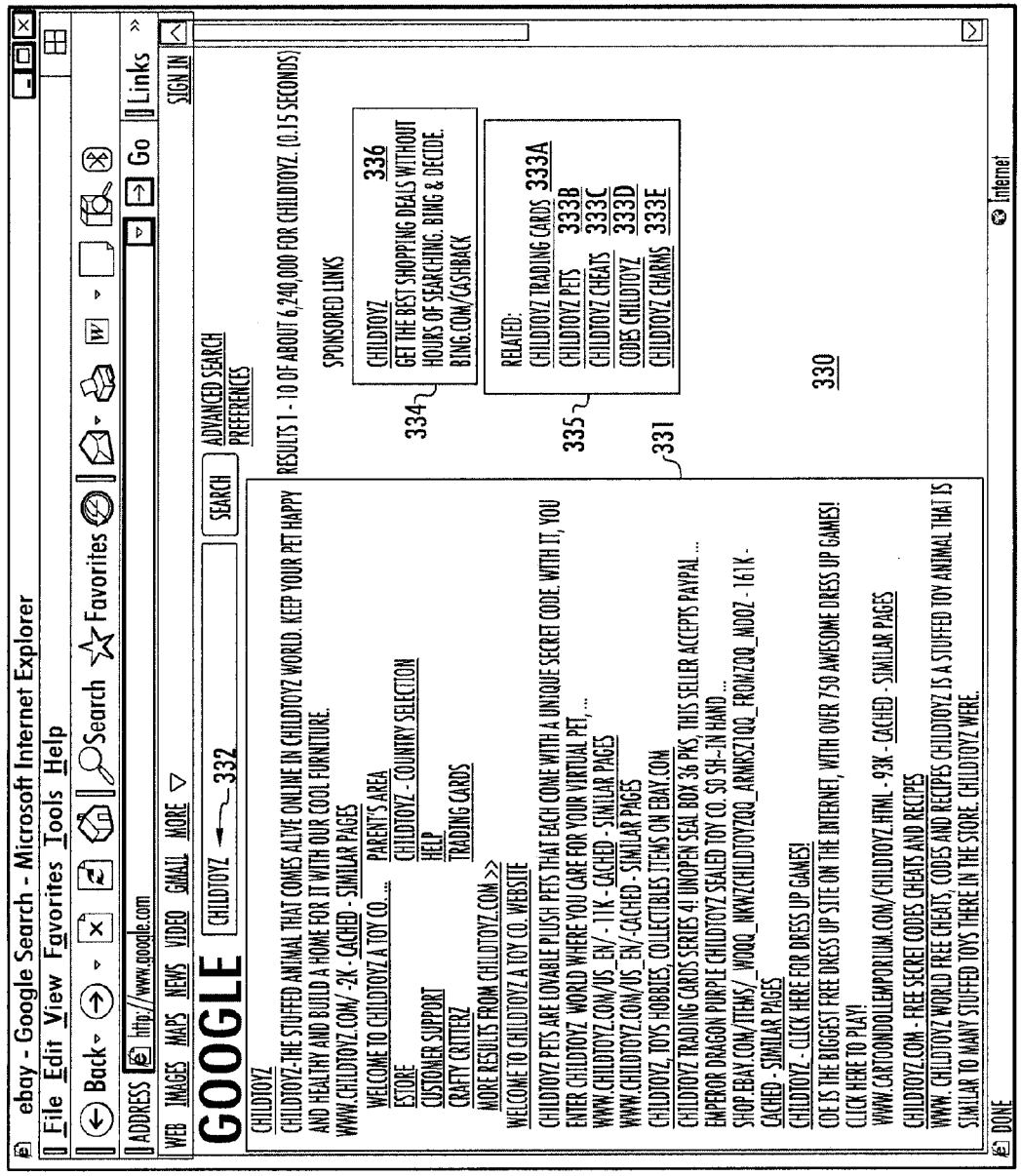

In FIG. 3D, the search engine results page 330 includes a search results block 331 that includes search results that a search engine has identified as being relevant to the initial query 332 (in the figure, "childztoyz"). The search engine results page also includes references 333A-E to each additional query (in the figure, "childztoyz trading cards," "childztoyz pets," "childztoyz cheats," "codes childztoyz," and "childztoyz charms," respectively). The search engine results page 330 also includes an advertising block 334 that includes an advertisement 336 that is targeted to the initial query 332.

The search engine results page 330 also includes a suggested query term block 335 that references the additional queries 333A-E, however the suggested query term block 335 does not include advertisements or advertisement blocks that are targeted to the additional queries 333A-E. The auction engine, ad selector engine, or mixer engine may choose to not include advertising blocks if an insufficient number of advertisements are located, or if, for example, the selected advertisements do not satisfy predetermined relevancy and/or diversity scores. For example, advertisements may not be included in the search engine results page 330 if the auction engine, ad selector engine, or mixer engine determine that the revised queries do not share a common context, i.e., a semantic drift has occurred. Semantic drift can be determined by, for example, a particularly low relevance or low click-through-rate for a particular revised query with respect to an initial query.

Figure 3E:
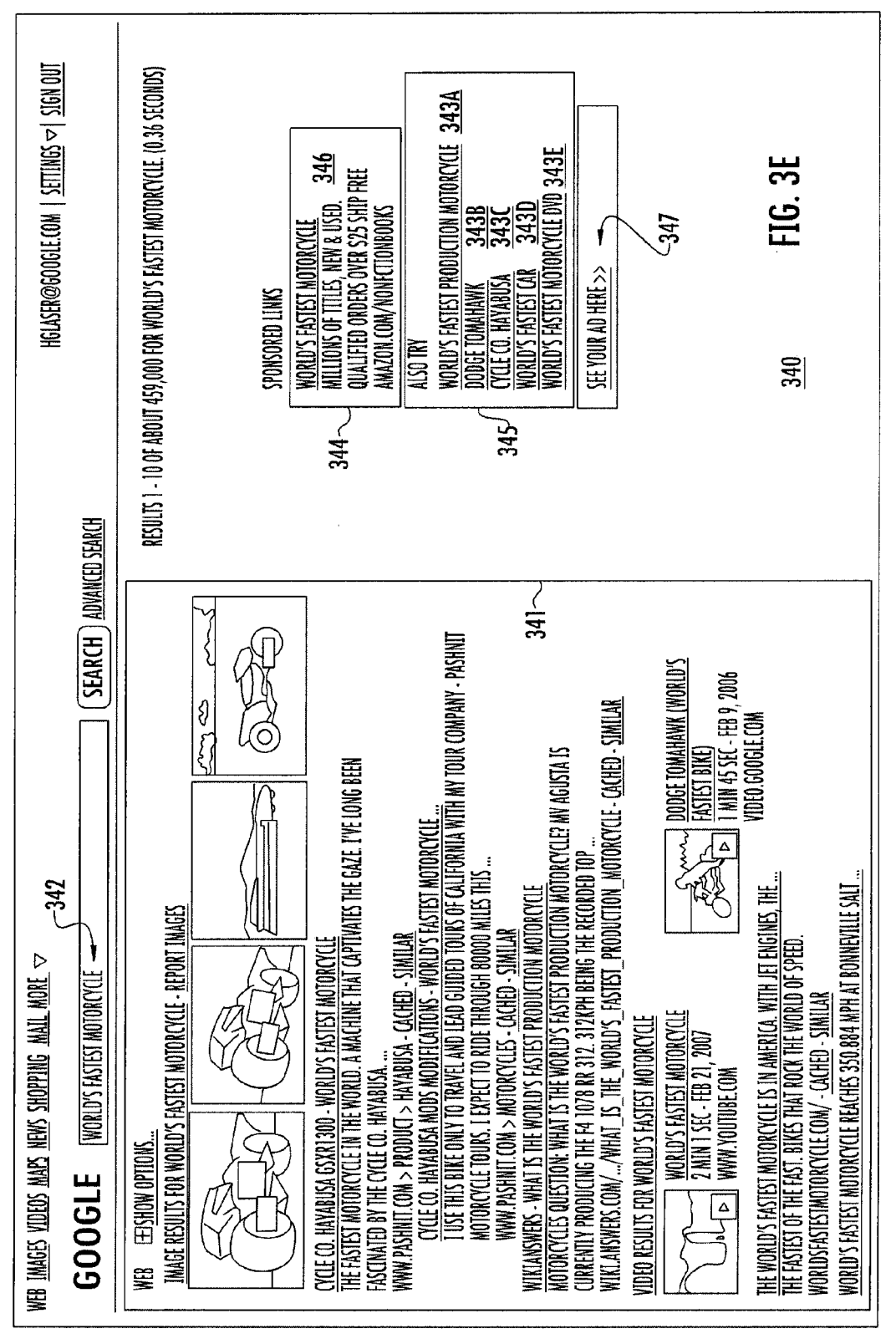

In FIG. 3E, the search engine results page 340 includes a search results block 341 that includes search results that a search engine has identified as being relevant to the initial query 342 (in the figure, "world's fastest motorcycle"). The search engine results page also includes references 343A-E to each additional query (in the figure, "world's fastest production motorcycle," "dodge tomahawk," "Suzuki hayabusa," "world's fastest car," and "world's fastest motorcycle DVD," respectively). The search engine results page 340 also includes an advertising block 344 that includes an advertisement 346 that is targeted to the initial query 342.

The search engine results page 340 also includes an additional query block 345 that references the additional queries 343A-E, however the additional query block 345 does not include advertisements that are targeted to the additional queries 343A-E. The auction engine, ad selector engine, or mixer engine may choose to not include advertising blocks if, for example, an insufficient number of advertisements are located, or if the selected advertisements do not satisfy predetermined relevancy and/or diversity scores. For example, advertisements may not be included in the search engine results page 340 if the auction engine, ad selector engine, or mixer engine determine that the revised queries do not share a common context, i.e., a semantic drift has occurred. Notably, however, the search engine results page 340 includes an auction participation link 347 that, when selected by the user, establishes a dialogue to invite the user to submit advertisements that may be displayed in an advertisement block for future search queries.

As described above, one or more additional suggestions can be provided to a user in response to receipt of an initial query. In addition, one or more content items can be provided along with the respective additional queries. When additional queries are identified, one or more queries may include a plurality of content items, while other additional queries may have more or fewer content items associated therewith. In some implementations, a balancing operation may be performed that either respectively broadens or narrows search parameters associated with locating specific content items that are associated with a given additional (or the initial) query.

FIGS. 4A to 4E are block diagrams that show example processes for balancing candidate content items targeted to queries. For example, content items can include text, images, sound, video, animation, application code, embedded links, or other such content. In some implementations, content items can be related to advertising, and can be selected by the ad selector engine 109, as shown in FIG. 1. In some implementations, the number, type, or provider of content items (e.g., advertisements) selected by the ad selector engine 109 may vary among queries provided by the mixer engine 106 (shown in FIG. 1). For a particular query, for example, the number of advertisements selected by the ad selector engine 109 may be relatively high or low in comparison with advertisements selected for other queries. By balancing the numbers and types of content items associated with queries, for example, each query may be similarly represented by content items, and a diverse selection of content items may be ensured.

Figure 4A:
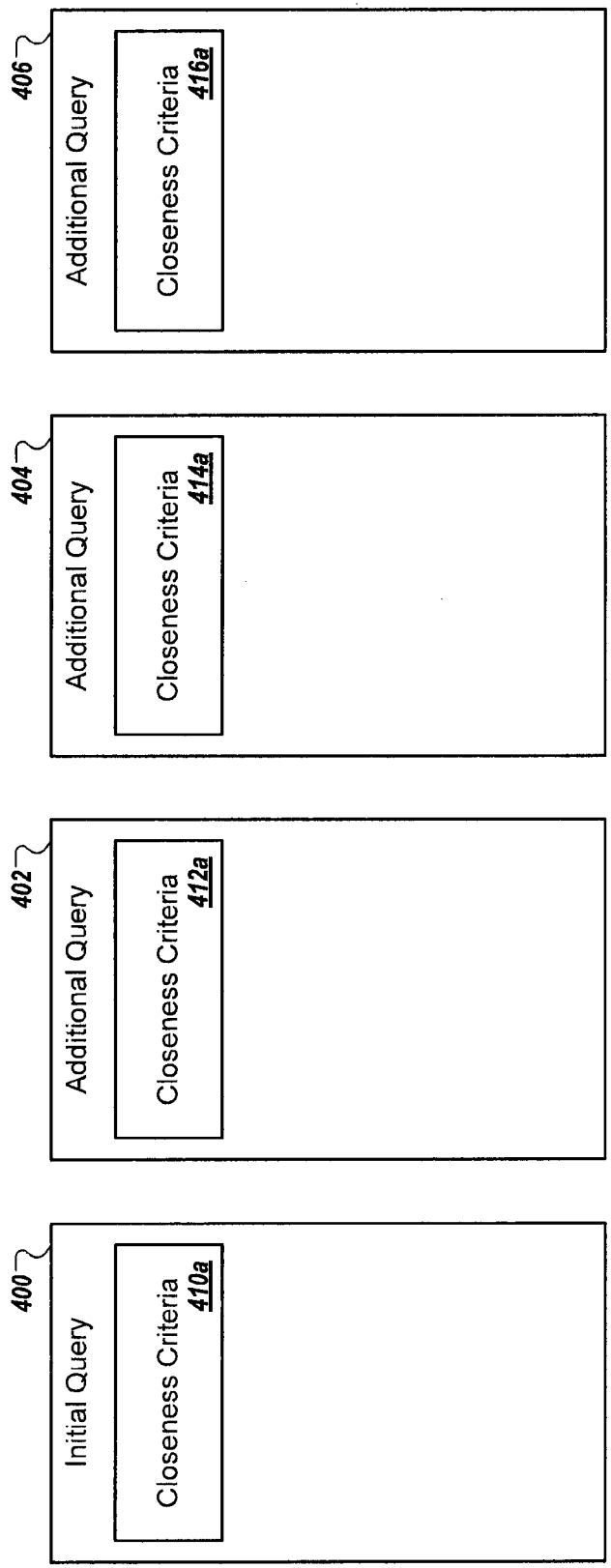
FIGS. 4A to 4E are block diagrams that show example processes for balancing candidate content items targeted to queries.

In FIG. 4A, queries can be associated with closeness criteria. In the present example, an initial query 400 and additional queries 402, 404, and 406 are shown, although other instances may include more or fewer queries. In some implementations, the initial query 400 may be similar to the initial query 120 (shown in FIG. 1), and the additional queries 402, 404, 406 may be similar to the additional query 122 provided by the query reviser engine 107 (also shown in FIG. 1).

As shown in FIG. 4A, the initial query 400 may be associated with closeness criteria 410a, and additional queries 402, 404, and 406 may be respectively associated with closeness criteria 412a, 414a, and 416a. In some implementations, closeness criteria may include a numerical value, such as a score or threshold defining a relevancy or semantic distance between a query and content items. In some implementations, the closeness criteria 410a, 412a, 414a, and 416a can include default values. For example, for an initial content item request by the mixer engine 106, the closeness criteria 410a, 412a, 414a, and 416a can be accessed and applied by the mixer engine. In some implementations, the closeness criteria 410a for the initial query 400 can be different than closeness criteria 412a, 414a, 416a for any or all of the additional queries 402, 404, 406. For example, the closeness criteria 410a may designate a closer or farther semantic distance between the initial query 400 and relevant content items, in comparison with any or all of the closeness criteria 412a, 414a, or 416a. In some implementations, closeness criteria may be adjusted based on past activity. For example, if previous requests by the mixer engine 106 for content items related to a particular query returned too few or too many items, closeness criteria may be adjusted to indicate a broader or narrower match. Thus, anonymized historical data related to previous content item requests may be stored and accessed by the mixer engine 106, for example on an opt-in basis.

Figure 4B:
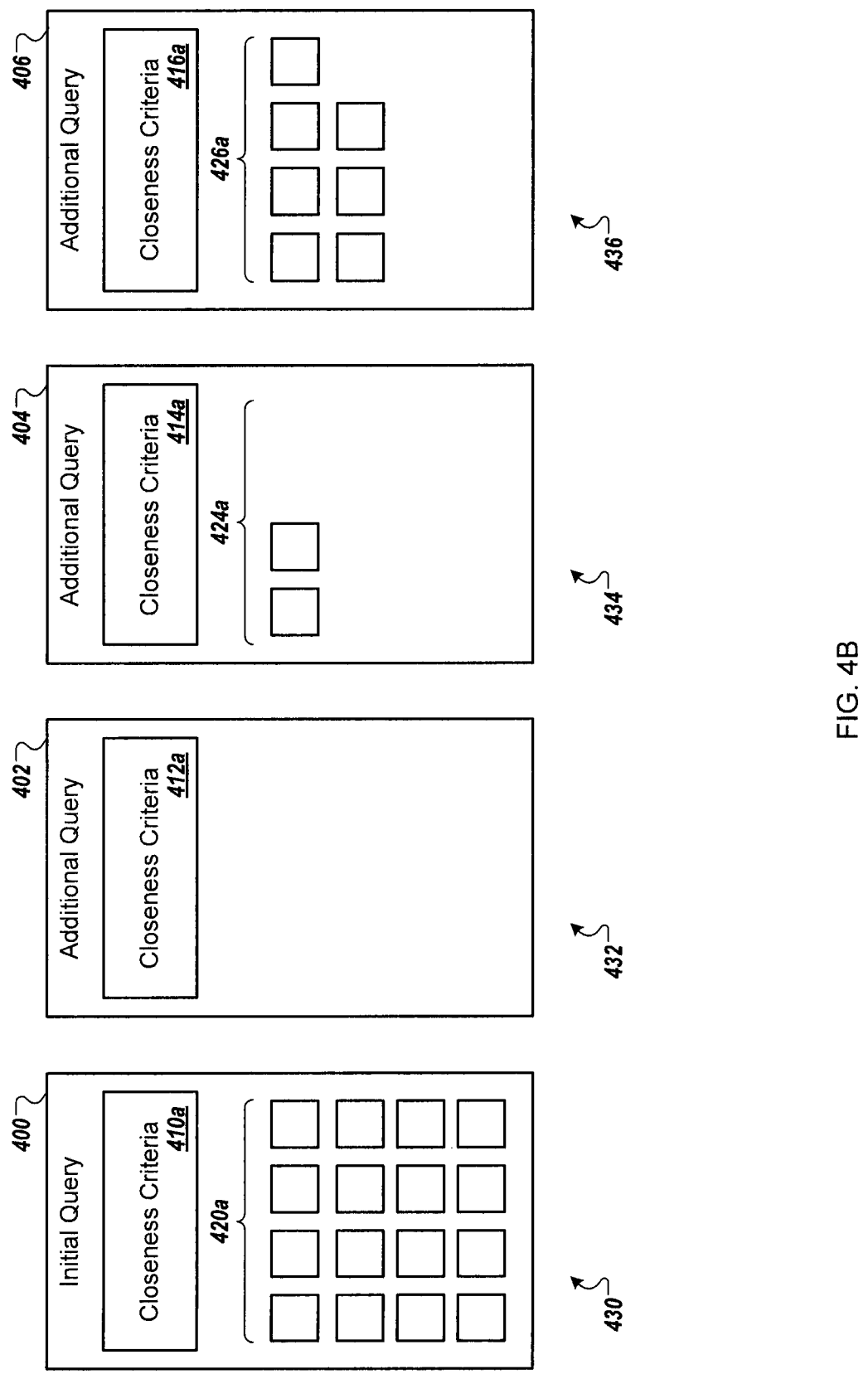

In FIG. 4B, candidate content items can be associated with queries. In some implementations, the ad selector engine 109 can determine an association between candidate content items (e.g., candidate advertisements) and queries. For example, for each of the queries 400, 402, 404, and 406, the ad selector engine 109 can reference one or more query keywords, and can use associated closeness criteria 410a, 412a, 414a, and 416a to select relevant content items. The selection may include referencing an indexed content database, for example. In some implementations, the ad selector engine 109 may be provided with information related to whether a particular query is an initial query or an additional query. In some implementations, a particular query may be provided without information related to whether the query is an initial query or an additional query.

In some implementations, an association between the initial query 400 and content items 420a may be identified, an association between the additional query 404 and content items 424a may be identified, an association between the additional query 406 and content items 426a may be identified, and no associated content items may be identified for the additional query 402. In some implementations, candidate content items can be provided to the mixer engine 106 in association with a related query as a block. For example, the initial query 400 and the content items 420a (or information referencing the content items) can form a block 430, by including a common group identifier or by being included in a common data structure or code object. Correspondingly, the additional query 404 and the content items 242a can form a block 434, and the additional query 406 and the content items 426a can form a block 436. Additionally, for example, the additional query 402 may be determined as a block 432, including no content items.

Figure 4C:
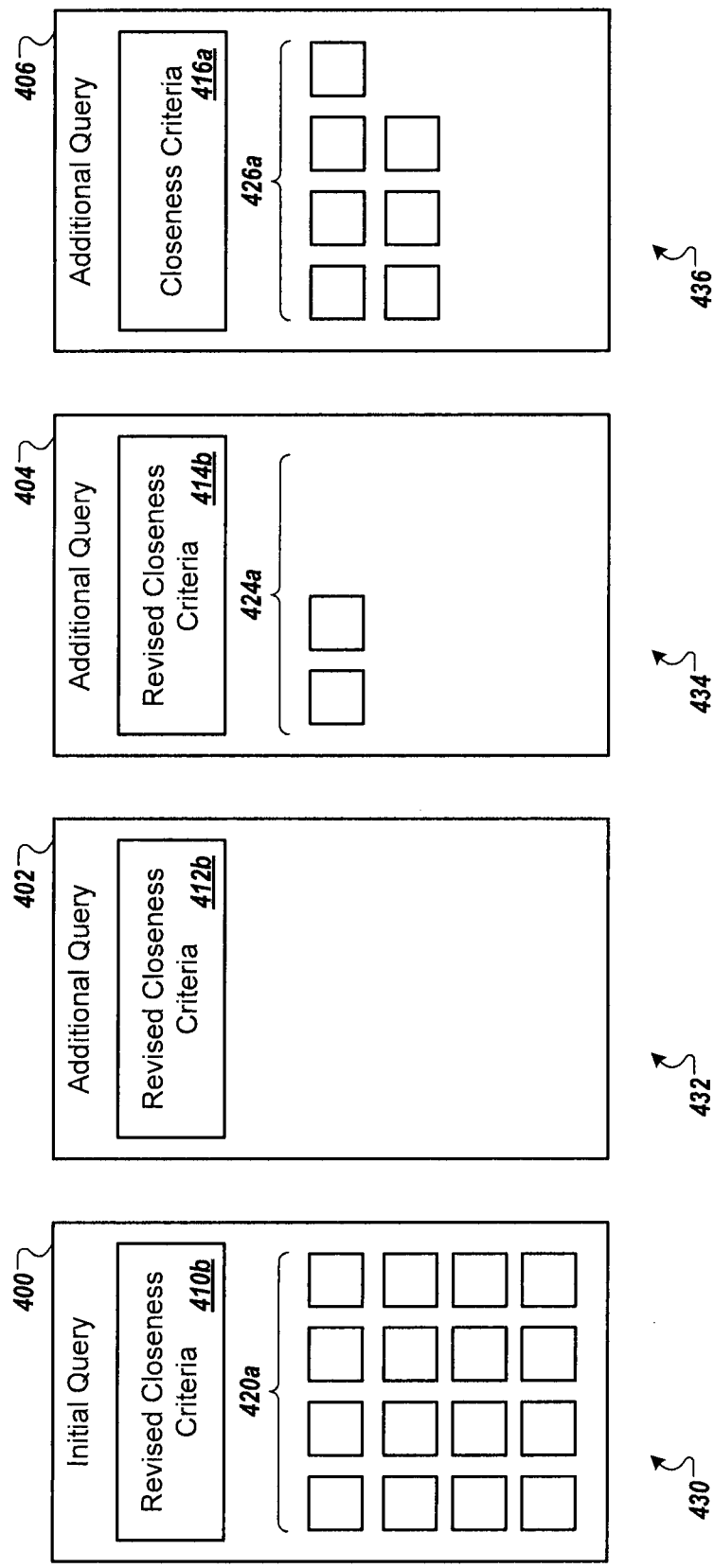

In FIG. 4C, blocks can be compared and closeness criteria can be revised. In some implementations, the mixer engine 106 can evaluate and compare blocks to determine whether a particular block includes, for example, too many or too few content items, too many or too few content items of a particular type, or too many or too few content items from a particular provider. Comparison criteria can include determining an average number of content items across multiple queries, determining a target number of content items to be associated with each query, or some other such mechanism. Additionally, for example, comparison criteria can include determining whether content items represent a variety of content types and/or content providers. In the present example, the block 430 may be determined to be associated with too many content items 420a, the block 432 may be determined to be associated with no content items, the block 434 may be determined to be associated with too few content items 424a, and the block 436 may be determined to be associated with an appropriate number of content items 426a.

Based at least in part on comparisons between the blocks 430, 432, 434, and 436, refinements can be determined for balancing the blocks. For example, as the block 430 may be determined to be associated with too many content items 420a, a revised closeness criterion 410b can be specified for the initial query 400, indicating a narrowing of a search for relevant content items. As the block 404 may be determined to be associated with too few content items 424a, for example, a revised closeness criterion 414b can be specified for the additional query 404, indicating a broadening of a search for relevant content items. As the block 406 may be determined to be associated with an appropriate number of content items 426a, for example, the closeness criteria 416a may be unmodified. In the present example, the additional query 402 may be associated with no content items. In some implementations, a revised closeness criterion 412b may be specified for the additional query 402, indicating a broadening of a search for relevant content items. In some implementations, a further search for content items associated with the additional query 402 may be discontinued.

Figure 4D:
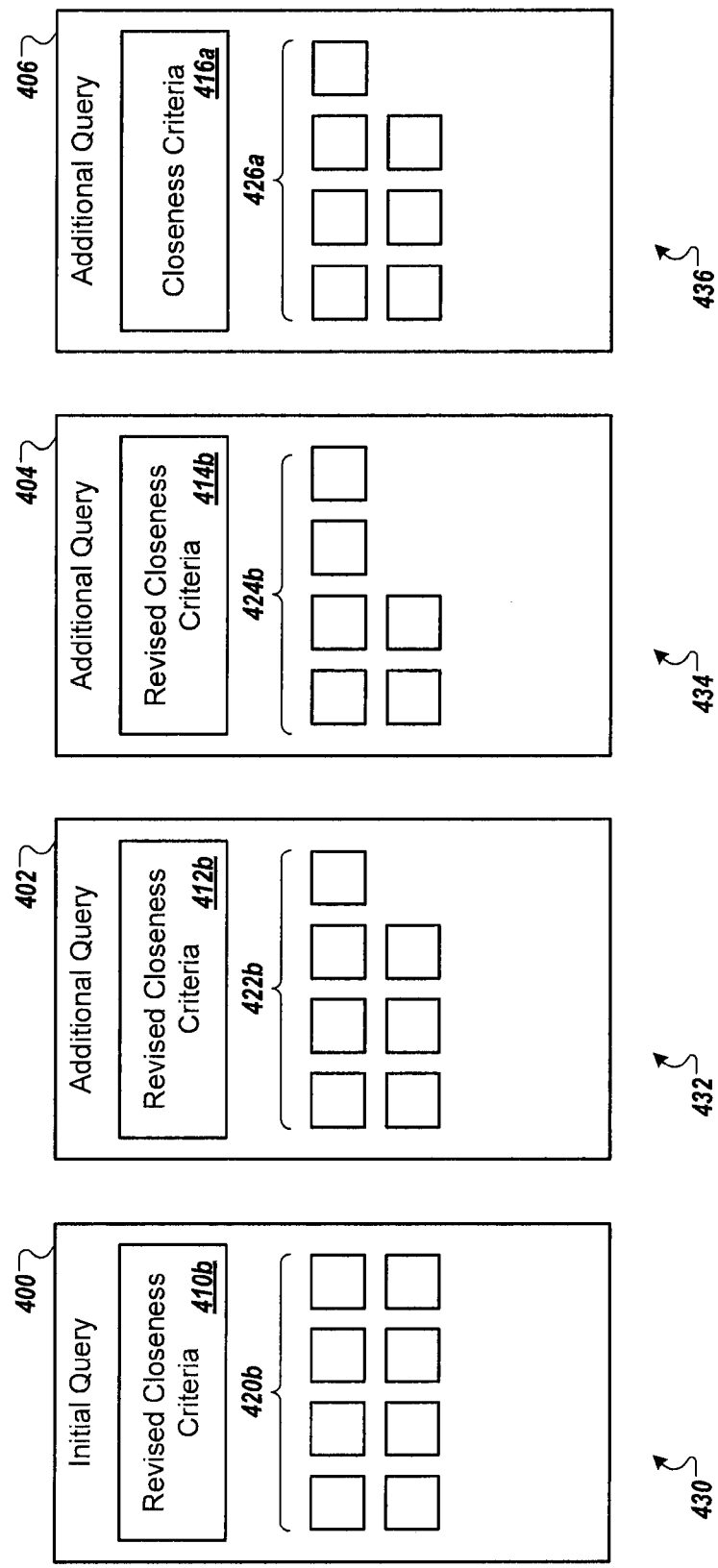

In FIG. 4D, refined candidate content items can be identified. In some implementations, the ad selector engine 109 can use the revised closeness criteria to select refined candidate content items. For example, based on the initial query 400 and the revised (i.e., narrowed) closeness criteria, content items 420b may be selected. Correspondingly, for example, based on the additional query 402 and the revised (i.e., broadened) closeness criteria 412b, content items 422b may be selected, and based on the additional query 404 and the revised (i.e., broadened) closeness criteria 414b, content items 424b may be selected.

Figure 4E:
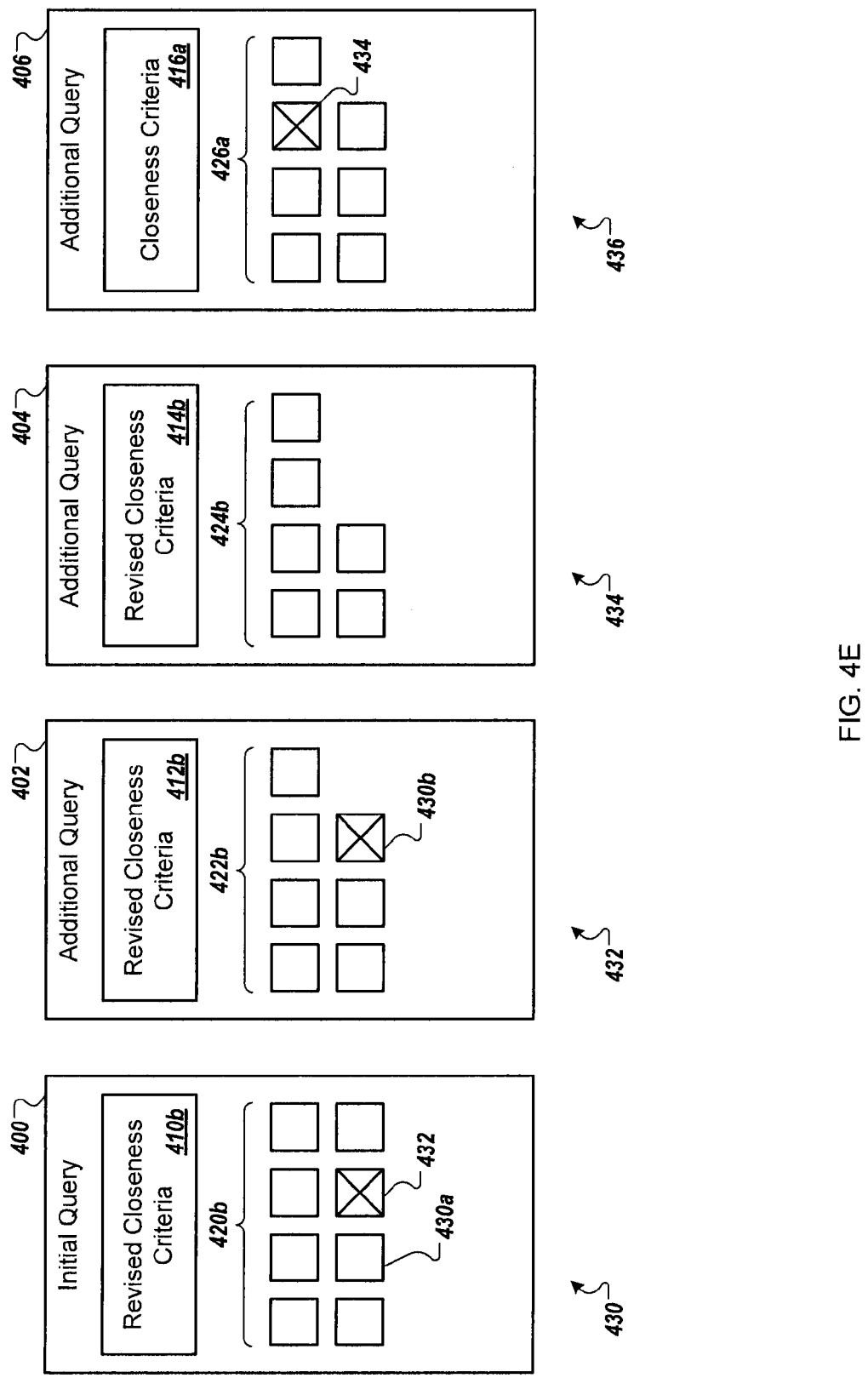

In FIG. 4E, content blocks can be further balanced and can be provided to further processes or devices. In some implementations, the mixer engine 106 can mark or remove particular content items to accomplish further balancing. For example, the mixer engine 106 may determine that content item 430a (associated with block 430) and content item 430b (associated with block 432) may reference the same or similar content. Thus, in the present example, the mixer engine 106 may remove or mark content item 430b, to ensure that duplicate content items are not represented among the blocks 430, 432, 434, and 436. As another example, the mixer engine 106 may determine that content item 432 is associated with a provider that is overrepresented among content items associated with the blocks 430, 432, 434, and 436. Thus, in the present example, the mixer engine 106 may remove or mark content item 432, to ensure that content providers are proportionally represented among the blocks. As another example, the mixer engine 106 may determine that content item 434 is related to a provider that has indicated a preference to not be associated with the additional query 406. Thus, in the present example, the mixer engine 106 may remove or mark the content item 434.

Upon balancing, for example, each of the content blocks 430, 432, 434, and 436 can be provided to other processes and/or devices. For example, the content blocks 430, 432, 434, and 436 may be provided to the auction engine 110, where content items may be further refined based on additional (e.g., financial) criteria. As another example, the content blocks may be provided to a display device, where queries may be presented with associated content items in a web browser (e.g., as shown in FIGS. 3A-3E).

Figure 5:
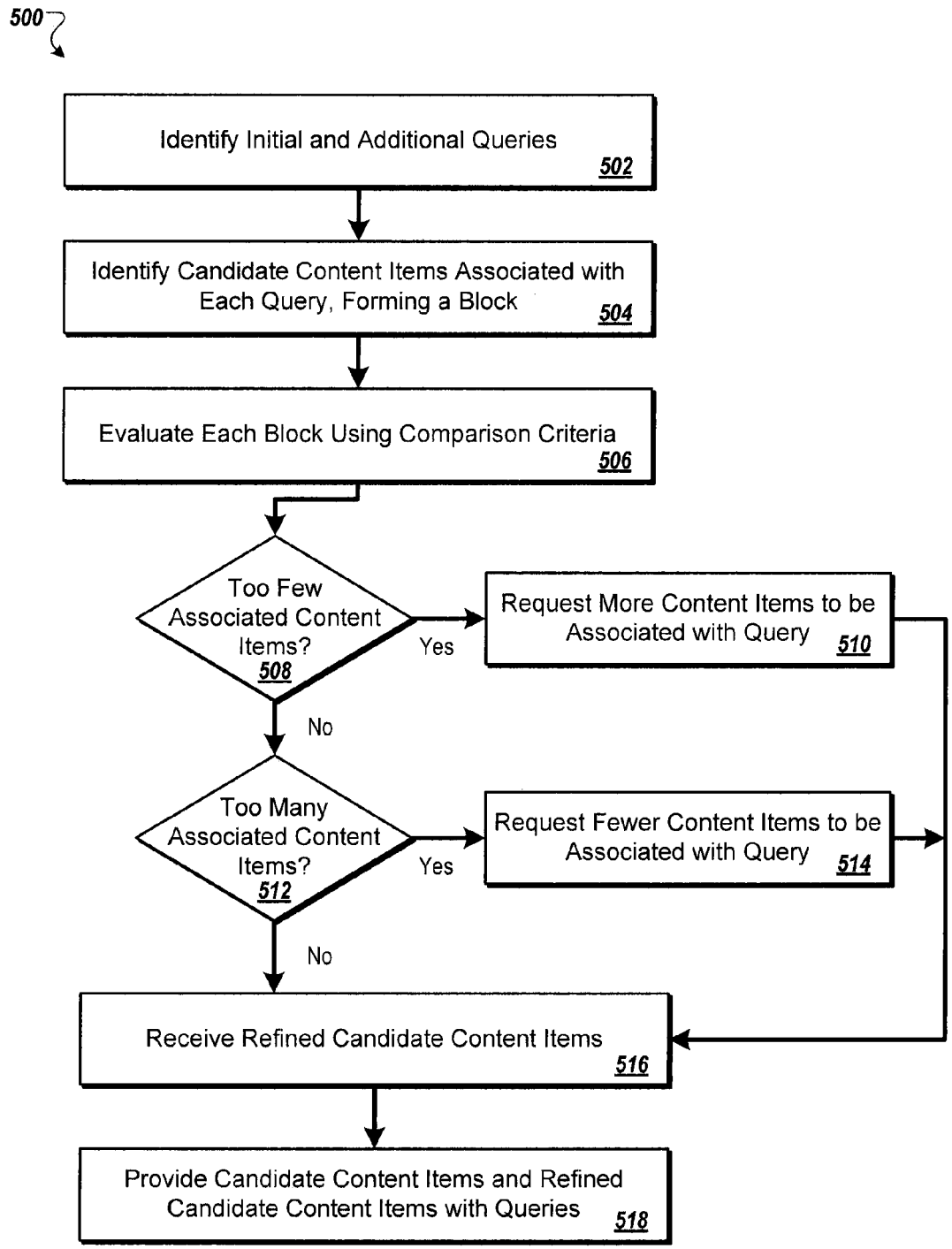
FIG. 5 is a flowchart of an example process for providing candidate content items with queries.

FIG. 5 is a flowchart of an example process 500 for providing candidate content items with queries. Briefly, the process 500 includes identifying initial and additional queries, identifying candidate content items associated with each query (forming a block), and evaluating each block using comparison criteria. If a block has too few content items, more content items are requested. If a block has too many content items, fewer content items are requested. For each query, refined candidate content items are received in response to the requests, and candidate and refined candidate content items are provided with respective queries. In some implementations, the process 500 may be performed by a system such as the system 100, and will be described as such for clarity.

In more detail, at 502, initial and additional queries are identified. For example, the mixer engine 106 may identify the initial query 120, and may identify the additional query 122 provided by the query reviser engine 107. At 504, for each query, one or more candidate content items are identified. In some implementations, the candidate content items can be associated with the query, forming a block. For example, the mixer engine 106 may provide the initial query 120 and the additional query 122 to the ad selector engine 109, and may receive candidate advertisements 124 associated with each query.

At 506, each block is evaluated using comparison criteria. For example, the mixer engine 106 may perform such an evaluation. In some implementations, the comparison criteria can include criteria for comparing the numbers, types (e.g., presentation format or subject category), and/or providers of candidate content items associated with each block. For example, an average or target number of candidate content items per block may be identified. As another example, an average or target number of content items per content type and/or content provider per block may be identified. In some implementations, the comparison criteria can be used to determine if one or more blocks have too few or too many associated content items. For example, if a block has too few content items (508), more content items can be requested to be associated with the related query (510). If, for example, a block has too many content items (512), fewer content items can be requested to be associated with the related query (514).

In some implementations, the request can include specifying a closeness criteria which defines a semantic distance between subject matter associated with a query and identified content items for the query. For example, the closeness criteria can include one or more numeric values such as scores or thresholds that can indicate a preferred refinement of candidate content items associated with each query. The numeric values, for example, can be designated to indicate a request for more or fewer content items to be associated with a particular query. Additionally, for example, the numeric values can be designated to indicate a request for more or fewer content items of a particular type and/or a request for more or fewer content items from a particular provider. One or more of the queries may be submitted to the ad selector engine 109, along with closeness criteria, for example.

For each query, refined candidate content items are received at 516, in response to the request. For example, the refined candidate content items may be provided by the ad selector engine 109. In some implementations, further refinement of the candidate content items may be performed by the mixer engine 106. For example, duplicate content items among the queries may be identified and marked or removed. As another example, content items may be identified for which a content item provider has expressed an intention to disassociate the content items from one or more queries; such content items may be marked or removed.

At 518, candidate content items and refined candidate content items are provided with respective queries. For instance, the content items may be provided to the auction engine 110 for further processing, or may be provided to a browser for presentation.

Figure 6:
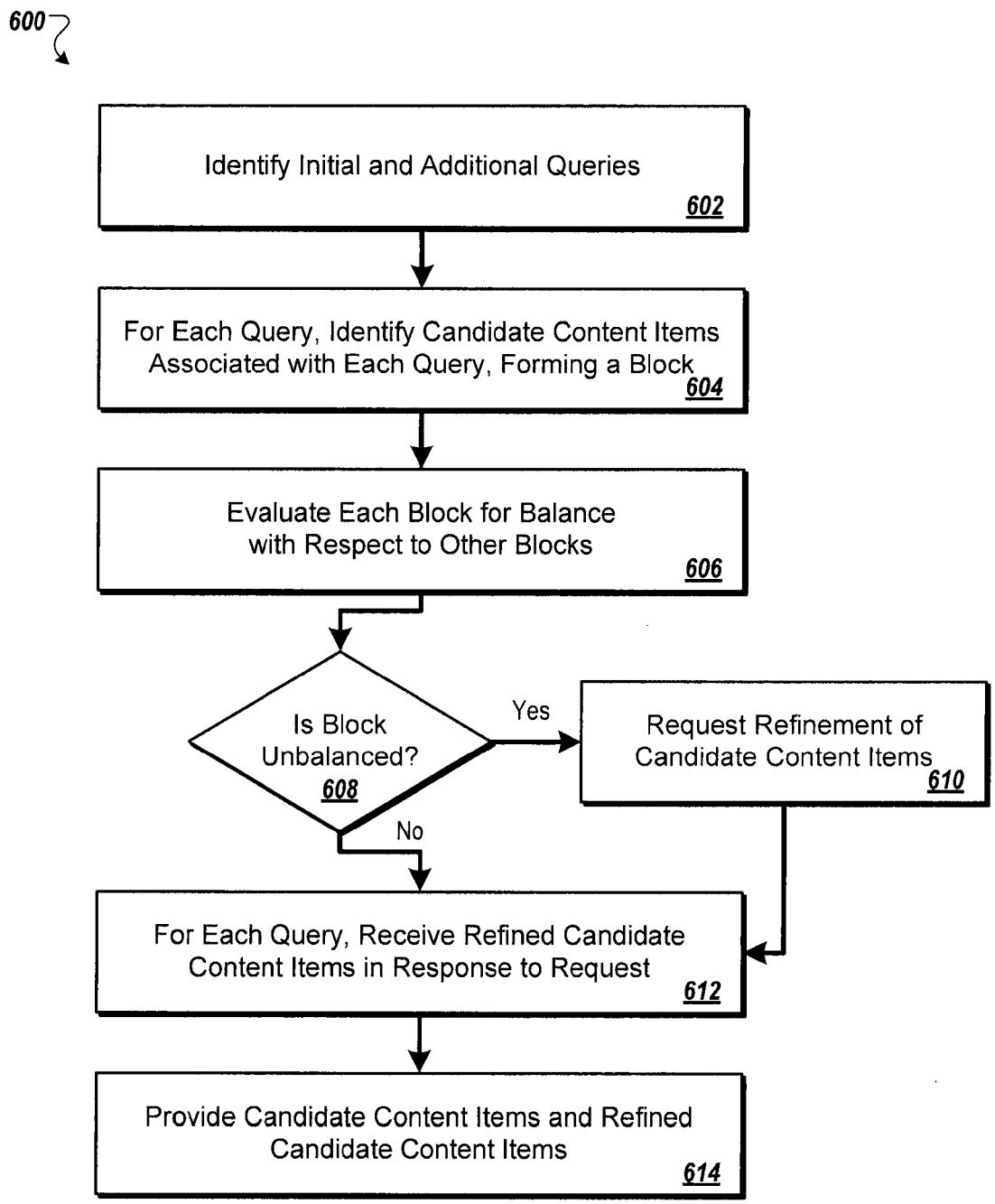
FIG. 6 is a flowchart of an example process for evaluating blocks for balance and for providing candidate content items with queries.

FIG. 6 is a flowchart of an example process 600 for evaluating blocks for balance and for providing candidate content items with queries. Briefly, the process 600 includes identifying an initial query and one or more additional queries and identifying one or more candidate content items for each query, the one or more candidate content items associated with a query forming a block. Each block can be evaluated for balance. If a block is unbalanced, a refinement of the candidate content items can be requested. For each query, refined candidate content items can be received in response to the request, and content items can be provided. In some implementations, the process 600 may be performed by a system such as the system 100, and will be described as such for clarity.

At 602, an initial query and one or more additional queries are identified. For example, the queries may be identified by the mixer engine 106. For each query, one or more candidate content items may be identified at 604, the candidate content items associated with the query forming a block. For example, each query may be provided to the ad selector engine 109, and candidate content items (or references to items) may be provided by the ad selector engine 109. The ad selector engine 109 may or may not be provided with information related to an "initial" or "additional" status of each query.

At 606, each block is evaluated for balance with respect to other blocks. In some implementations, balance can be a measure that considers a number of content items that are associated with a given block as compared to a number of content items that are associated with one or more other blocks. For example, balance may be related to the number, type, and/or content provider of content items associated with each block. A block that is associated with substantially more or fewer content items (or more or fewer content items of a particular type or from a particular provider) relative to other blocks may be determined to be unbalanced. If a block is determined to be unbalanced (608), a refinement of the candidate content items may be requested (610). For example, the mixer engine 106 may request that the ad selector engine 109 provide a refined set of content items for a particular block, such that the block is balanced relative to other blocks associated with other queries.

For each query, refined candidate content items are received in response to the request(s) at 612. For example, the mixer engine 106 may receive the refined candidate content items. At 612, various groups (i.e., blocks) of candidate content items and refined candidate content items associated with each query may be relatively balanced, for example. At 614, candidate content items and refined candidate content items with respective queries are provided for display or other processing by a device. For example, content items and respective queries may be provided to the auction engine 110 or to a web browser.

Figure 7:
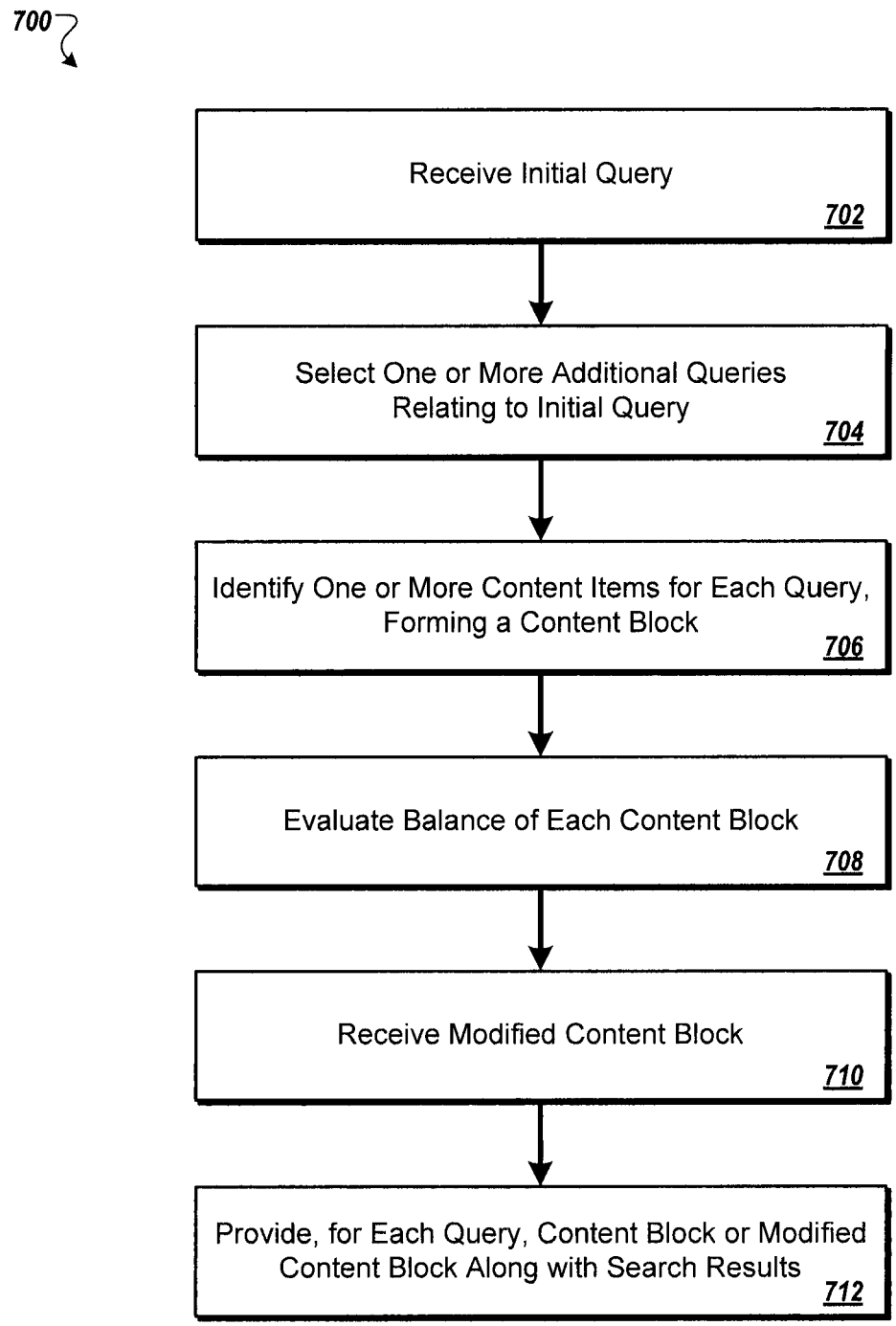
FIG. 7 is a flowchart of an example process for evaluating blocks for balance and for providing candidate content items with queries and search results.

FIG. 7 is a flowchart of an example process 700 for evaluating blocks for balance and for providing candidate content items with queries and search results. Briefly, the process 700 includes receiving an initial query, selecting one or more additional queries relating to the initial query, identifying one or more content items for each query (thereby forming a content block), evaluating the balance of each content block, receiving modified content blocks, and providing, for each query, a content block or modified content block along with search results.

At 702, an initial query is received. For example, the initial query 120 may be received or identified by the mixer engine 106. At 704, one or more additional queries relating to the initial query (e.g., the initial query 120) are selected. For example, based at least in part on the initial query 120, the query reviser engine 107 may select the additional query 122 and may provide the query 122 to the mixer engine 106. At 706, one or more content items are identified for each query, the one or more content items forming a content block. For example, the initial query 120 and the additional query 122 may be provided to the ad selector engine 109. Based at least in part on the queries 120, 122, for example, the ad selector engine 109 may identify candidate advertisements 124, and may provide the advertisements 124 to the mixer engine 106.

At 708, a balance of each content block is evaluated. For example, the mixer engine 106 may determine that too few advertisements are associated with a content block for a particular query relative to other content blocks for other queries. As another example, the mixer engine 106 may determine that too many advertisements from a particular advertiser are included in a particular content block relative to other content blocks. If a particular content block is determined to be unbalanced by the mixer engine 106, for example, a modified content block can be requested from and provided by the ad selector engine 109. Modified content blocks are received at 710.

At 712, content blocks or modified content blocks are provided for each query, along with search results associated with the initial query for display or other processing by a device. For example, the search engine 111 may identify search results 126 associated with the initial query 120. The initial query 120, the additional query 122, the search results 126, content blocks, and/or modified content blocks (e.g., a block including the advertisements 131) can be presented within the search engine results page 101, for example.

Figure 8:
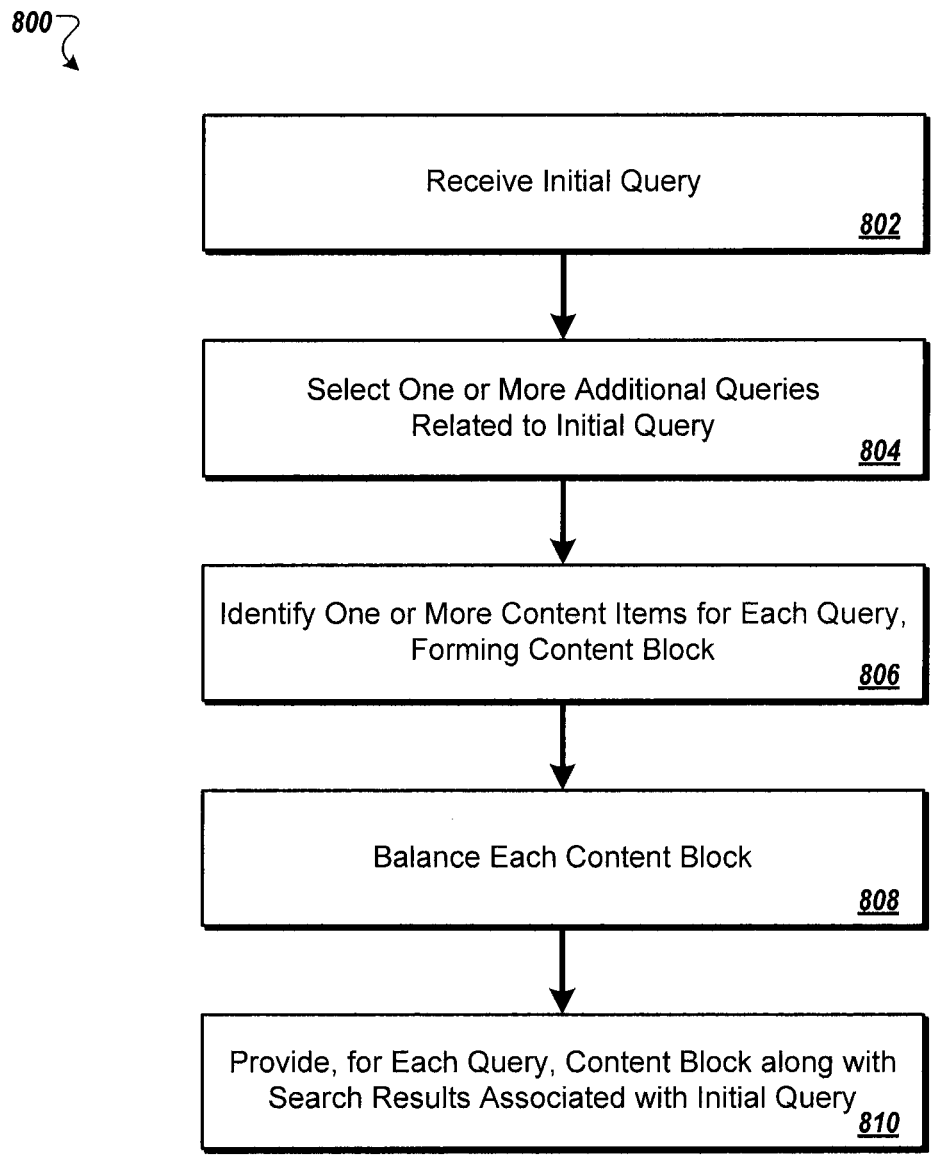
FIG. 8 is a flowchart of an example process for evaluating blocks for balance and for providing candidate content items with queries and search results.

FIG. 8 is a flowchart of an example process 800 for evaluating blocks for balance and for providing candidate content items with queries and search results. Briefly, the process 800 includes receiving an initial query, selecting one or more additional queries relating to the initial query, identifying one or more content items for each query (forming a content block), evaluating a balance of each content block, receiving a modified content block, and providing, for each query, a content block or modified content block along with search results associated with the initial query for display or other processing by a device. In some implementations, the process 800 may be performed a system such as the system 100, and will be described as such for clarity.

At 802, an initial query is received. For example, the initial query 120 may be received or identified by the mixer engine 106. The initial query 120, for example, may include one or more query terms. At 804, one or more additional queries relating to an initial query (e.g., the initial query 120) are selected. For example, based at least in part on the initial query 120, the query reviser engine 107 may select the additional query 122 and may provide the query 122 to the mixer engine 106. In some implementations, an additional query may include one or more terms from the initial query, may include one or more additional terms, and may be contextually relevant to the initial query. For example, an initial query may be "childztoyz", and an additional query may be "childztoyz trading cards". In some implementations, an additional query may represent a query that has historically been entered by users after having entered the initial query. For example, after initially entering the query "childztoyz", one or more users may have subsequently entered "childztoyz trading cards" or "childztoyz cards."

At 806, one or more content items are identified for each query, the one or more content items forming a content block. For example, the initial query 120 and the additional query 122 may be provided to the ad selector engine 109. Based at least in part on the queries 120, 122, for example, the ad selector engine 109 may identify candidate advertisements 124, and may provide the advertisements 124 to the mixer engine 106.

Each content block (e.g., a block associated with a query and candidate advertisements) may be balanced at 808. For example, the mixer engine 106 may perform such balancing by comparing each block with other blocks and/or by using comparison criteria. In some implementations, balancing can include having the same (or substantially the same) number of content items being associated with each query. For example, if it is determined that a particular content block is associated with more or fewer content items relative to other content blocks, the content block may be balanced to be associated with a similar number of content items as the other content blocks. In some implementations, balancing can include proportionally representing content item providers among content items. For example, if the mixer engine 106 determines that a particular advertiser is substantially overrepresented relative to other advertisers associated with the candidate advertisements 124, balancing can include reducing the number of content items associated with the particular advertiser. In some implementations, balancing can include requesting a broadening of a search for relevant content items for queries that have too few items in an associated block, or requesting a narrowing of a search for relevant content items for queries that have too many items in an associated block. For example, if the mixer engine 106 determines that a particular block is associated with too many or too few content items relative to an average number of items associated with other blocks, or relative to a predetermined number (or some other such standard), the mixer engine 106 may request a narrowing or broadening of a search for content items by the ad selector engine 109.

At 810, for each query, a content block is provided along with search results associated with the initial query for display or other processing by a device. For example, the mixer engine 106 may provide a block of candidate advertisements associated with the initial query 120 and a block of candidate advertisements associated with the additional query 122 to the auction engine 110 for additional processing. As another example, the mixer engine 106 may receive search results 126 from the search engine 111, and may provide the search results 126 along with initial and additional queries, and along with associated blocks of advertisements.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode data for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A method comprising:
   identifying an initial query;
   identifying one or more additional queries related to the initial query;
   for each query including for the initial query and the one or more additional queries, identifying one or more candidate content items and grouping the one or more candidate content items in a block for a respective query for presentation to a user;
   evaluating each block using comparison criteria including determining a number of content items to include in a respective block wherein the comparison criteria compares either a number of content items in each block to a number of content items in another block or a number of content items in a respective block that are from a same entity;
   based on the comparison criteria, determining one or more blocks that have too few or too many content items associated therewith based on the respective determined numbers;
   when a block has too few content items, requesting more content items to be associated with a respective query including broadening the respective query to enable identification of more content items to be associated with the respective query;
   else, when a block has too many content items, requesting fewer content items to be associated with a respective query including narrowing the respective query to filter out content items associated with the respective query;
   identifying refined candidate content items in response to the request for queries that had too few or too many content items; and
   providing a plurality of blocks for presentation responsive to the initial query including original candidate content items or refined candidate content items with respective queries in a given block wherein providing includes providing a first block including the initial query and original or refined candidate content items associated with the initial query and providing a second different block including an additional query of the one or more additional queries and original or refined candidate content items associated with the additional query, and wherein the original or refined candidate content items in each block are different.

2. The method of claim 1, wherein the comparison criteria specifies a closeness criteria which defines a semantic distance between subject matter associated with each query or identified content items for each query.

3. The method of claim 1, wherein the providing is to a browser.

4. The method of claim 1, wherein the providing is to an auction engine.

5. The method of claim 1, further comprising identifying content items for which a content item provider has expressed an intent to disassociate the content items from one or more of the respective queries and eliminating the identified content items from a respective block.

6. A method comprising:
   identifying an initial query and one or more additional queries related to the initial query; for each query, identifying one or more candidate content items and grouping the one or more candidate content items in a block for presentation to a user responsive to the initial query;
   evaluating each block for balance with respect to other blocks including determining a number of candidate content items in each block and a target number of candidate content items for a given block;
   when a block is unbalanced based on having more or less than the target number of candidate content items, requesting a refinement of the candidate content items including narrowing or broadening a respective associated query for a given block to identify refined candidate content items;
   for each unbalanced block, receiving refined candidate content items in response to a request; and
   providing a plurality of blocks for presentation responsive to the initial query including candidate content items or refined candidate content items with respective queries for a given block for display or other processing by a device wherein providing includes providing a first block including the initial query and original or refined candidate content items associated with the initial query and providing a second different block including an additional query of the one or more additional queries and original or refined candidate content items associated with the additional query, and wherein the original or refined candidate content items in each block are different.

7. The method of claim 6, wherein balance is a measure that considers a number of content items that are associated with a given block as compared to a number of content items that are associated with one or more other blocks and wherein balancing further includes determining different numbers of content items to be associated with at least two blocks.

8. A method comprising:
   receiving an initial query;
   identifying one or more additional queries relating to the initial query;
   identifying one or more content items for each query and grouping the one or more content items in a block for presentation to a user responsive to the initial query;
   evaluating a balance of each content block including identifying any unbalanced blocks by comparing to other blocks, wherein an unbalanced block includes more or fewer content items than other blocks;
   for each unbalanced block, receiving a modified content block including modifying a respective query to narrow or broaden the query so as to reduce or increase a number of content items in a respective unbalanced block;
   providing, for each query, a content block or modified content block along with search results associated with the initial query for display or other processing by a device wherein providing includes providing a first block including the initial query and original or refined candidate content items associated with the initial query and providing a second different block including an additional query of the one or more additional queries and original or refined candidate content items associated with the additional query, and wherein the original or refined candidate content items in each block are different.

9. A method comprising:
   receiving an initial query;

identifying one or more additional queries relating to the initial query;

identifying one or more content items for each query and grouping the one or more content items in a block for presentation to a user;

balancing the content blocks including narrowing or broadening an associated query so as to reduce or increase a number of content items for at least one block; and providing after balancing, for each query, content blocks for the initial query and one or more additional queries along with search results associated with the initial query for display or other processing by a device, wherein the content items included in the respective block are different from search results associated with a respective query, wherein providing includes providing a first block including the initial query and original or refined candidate content items associated with the initial query and providing a second different block including an additional query of the one or more additional queries and original or refined candidate content items associated with the additional query, and wherein the original or refined candidate content items in each block are different.

10. The method of claim 9, wherein balancing includes having a similar number of content items being associated with each query.

11. The method of claim 9, wherein balancing includes proportionally representing content item providers among content items.

12. The method of claim 9, wherein balancing includes requesting a broadening of a search for relevant content items for queries that have too few items in an associated block.

13. The method of claim 9, wherein balancing includes requesting a narrowing of a search for relevant content items for queries that have too many content items in an associated block.

14. The method of claim 9, wherein the initial query includes one or more query terms.

15. The method of claim 9, wherein the one or more additional queries include one or more terms from the initial query.

16. The method of claim 9, wherein the one or more additional queries include one or more terms from the initial query and one or more additional terms.

17. The method of claim 9, wherein the one or more additional queries include at least a portion of the initial query.

18. The method of claim 9, wherein the one or more additional queries are contextually relevant to the initial query.

19. The method of claim 9, wherein the one or more additional queries represent queries that have historically been entered by users after having entered the initial query.

* * * * *